US012688807B2

(12) United States Patent
Kim et al.

(10) Patent No.: US 12,688,807 B2
(45) Date of Patent: Jul. 21, 2026

(54) PIXEL AND DISPLAY DEVICE

(71) Applicant: Samsung Display Co., Ltd., Yongin-Si (KR)

(72) Inventors: Hyeongseok Kim, Hwaseong-si (KR); Jangmi Kang, Seoul (KR); Junhyun Park, Suwon-si (KR); Minjae Jeong, Hwaseong-si (KR); Mukyung Jeon, Ulsan (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 19/292,401

(22) Filed: Aug. 6, 2025

(65) Prior Publication Data

US 2025/0363921 A1 Nov. 27, 2025

Related U.S. Application Data

(62) Division of application No. 18/088,716, filed on Dec. 26, 2022, now Pat. No. 12,400,564.

(30) Foreign Application Priority Data

Mar. 11, 2022 (KR) ........................ 10-2022-0030998

(51) Int. Cl.
*G09G 3/00* (2006.01)
*G09G 3/32* (2016.01)
*G09G 3/3233* (2016.01)

(52) U.S. Cl.
CPC ............... *G09G 3/006* (2013.01); *G09G 3/32* (2013.01); *G09G 2300/0426* (2013.01);
(Continued)

(58) Field of Classification Search
None
See application file for complete search history.

(56) References Cited

U.S. PATENT DOCUMENTS 7,414,599 B2 8/2008 Chung et al.
9,454,932 B2 9/2016 Ono et al.
(Continued)

FOREIGN PATENT DOCUMENTS

CN 110444160 A 11/2019
CN 111613178 A 9/2020
(Continued)

*Primary Examiner* — Krishna P Neupane
(74) *Attorney, Agent, or Firm* — Innovation Counsel LLP

(57) ABSTRACT

A pixel includes a light emitting element, a first transistor including a first electrode electrically connected to a first voltage line, a second electrode electrically connected to the light emitting element, and a gate electrode connected to a first node, a second transistor including a first electrode connected to a data line, a second electrode, and a gate electrode connected to a first scan line, a third transistor including a first electrode electrically connected to the first node, a second electrode connected to the second electrode of the first transistor, and a gate electrode connected to a second scan line, and a test transistor including a first electrode connected to the first electrode of the first transistor, a second electrode electrically connected to the second electrode of the second transistor, and a gate electrode connected to the second scan line.

6 Claims, 28 Drawing Sheets

(52) U.S. Cl.
CPC ............... *G09G 2300/0819* (2013.01); *G09G 2300/0852* (2013.01); *G09G 2300/0861* (2013.01); *G09G 2310/0202* (2013.01); *G09G 2310/08* (2013.01); *G09G 2330/12* (2013.01)

(56) References Cited

U.S. PATENT DOCUMENTS

| | | | | |
|---|---|---|---|---|
| 2006/0156121 | A1 | 7/2006 | Chung | |
| 2010/0220093 | A1 | 9/2010 | Choi | |
| 2012/0293479 | A1* | 11/2012 | Han ..................... | H04N 13/341 345/212 |
| 2014/0192037 | A1 | 7/2014 | Chung | |
| 2022/0157223 | A1 | 5/2022 | Wang et al. | |
| 2023/0196996 | A1 | 6/2023 | Zhao | |
| 2023/0351958 | A1 | 11/2023 | Liu | |

FOREIGN PATENT DOCUMENTS

| | | | |
|---|---|---|---|
| JP | 5756865 | B2 | 7/2015 |
| KR | 10-0560780 | B1 | 3/2006 |

* cited by examiner

PIXEL AND DISPLAY DEVICE

CROSS-REFERENCE TO RELATED APPLICATIONS

This application is a divisional application of U.S. patent application Ser. No. 18/088,716 filed on Dec. 26, 2022, which claims priority under 35 U.S.C. § 119 to Korean Patent Application No. 10-2022-0030998 filed on Mar. 11, 2022, in the Korean Intellectual Property Office, the disclosures of which are incorporated by reference herein in their entireties.

BACKGROUND

Embodiments of the present disclosure described herein relate to a display device.

Electronic devices, which provide images to a user, such as a smart phone, a digital camera, a notebook computer, a navigation system, a monitor, and a smart television include a display device for displaying the images. The display device generates an image and provides the user with the generated image through a display screen.

The display device includes a plurality of pixels and driving circuits for controlling the plurality of pixels. Each of the plurality of pixels includes a light emitting element and a pixel circuit for controlling the light emitting element. The driving circuit of a pixel may include a plurality of transistors organically connected to one another.

The display device may apply a data signal to a display panel. When a current corresponding to the data signal is supplied to the light emitting element, the display device may display a predetermined image.

SUMMARY

Embodiments of the present disclosure provide a pixel and a display device that are capable of operating at various operating frequencies.

Embodiments of the present disclosure provide a pixel and a display device including a configuration capable of testing an operation of an internal circuit.

According to an embodiment, a pixel includes a light emitting element, a first transistor including a first electrode electrically connected to a first voltage line, a second electrode electrically connected to the light emitting element, and a gate electrode connected to a first node, a second transistor including a first electrode connected to a data line, a second electrode, and a gate electrode connected to a first scan line, a third transistor including a first electrode electrically connected to the first node, a second electrode connected to the second electrode of the first transistor, and a gate electrode connected to a second scan line, and a test transistor including a first electrode connected to the first electrode of the first transistor, a second electrode electrically connected to the second electrode of the second transistor, and a gate electrode connected to the second scan line.

In an embodiment, in a test mode, a voltage of the gate electrode of the first transistor may be delivered to the data line through the third transistor, the first transistor, the test transistor, and the second transistor.

In an embodiment, the first scan line may receive a first scan signal. The second scan line may receive a second scan signal.

In an embodiment, the second scan signal may be activated before the first scan signal is activated.

In an embodiment, the pixel may further include a first capacitor connected between the first voltage line and a second node and a second capacitor connected between the first node and the second node.

In an embodiment, the pixel may further include a fourth transistor connected between the second node and the second electrode of the second transistor and including a gate electrode connected to a fourth scan line and a fifth transistor connected between the first node and the first electrode of the third transistor and including a gate electrode connected to the fourth scan line.

In an embodiment, at least one of the first to third transistors may be a P-type transistor, and each of the fourth transistor and the fifth transistor may be an N-type transistor.

In an embodiment, in a test mode, each of the first transistor, the second transistor, the third transistor, the fourth transistor, the fifth transistor, and the test transistor may be turned on.

In an embodiment, during a first frame of a test mode, a data signal delivered through the data line may be provided to a first end of the second capacitor through the second transistor and the fourth transistor. During a second frame of the test mode, a signal of a second end of the second capacitor may be delivered to the data line through the fifth transistor, the third transistor, the first transistor, the test transistor, and the second transistor.

In an embodiment, the pixel may further include a sixth transistor connected between the first electrode of the first transistor and a bias line, and comprising a gate electrode connected to a fifth scan line.

According to an embodiment, a pixel includes a light emitting element, a first transistor including a first electrode electrically connected to a first voltage line, a second electrode electrically connected to the light emitting element, and a gate electrode connected to a first node, a second transistor including a first electrode connected to a data line, a second electrode, and a gate electrode connected to a first scan line, a third transistor including a first electrode electrically connected to the first node, a second electrode connected to the second electrode of the first transistor, and a gate electrode connected to a second scan line, a first capacitor connected between the first voltage line and a second node, a second capacitor connected between the first node and the second node, a test transistor including a first electrode connected to the first electrode of the first transistor, a second electrode electrically connected to the second node, and a gate electrode connected to a third scan line, and a fourth transistor connected between the second node and the second electrode of the second transistor and including a gate electrode connected to a fourth scan line.

In an embodiment, the pixel may further include a fifth transistor connected between the first node and the first electrode of the third transistor, and comprising a gate electrode connected to the fourth scan line. During a first frame, a data signal delivered through the data line may be provided to a first end of the second capacitor through the second transistor and the fourth transistor. During a second frame, a signal of a second end of the second capacitor may be delivered to the data line through the fourth transistor, the third transistor, the first transistor, the test transistor, and the second transistor.

In an embodiment, the pixel may operate in a normal mode and a test mode. The normal mode may include the first frame. The test mode may include the first frame and the second frame.

In an embodiment, the pixel may further include a fifth transistor connected between the first node and the first electrode of the third transistor, and including a gate electrode connected to the fourth scan line.

In an embodiment, at least one of the first to third transistors may be a P-type transistor, and each of the test transistor, the fourth transistor and the fifth transistor may be an N-type transistor.

According to an embodiment, a display device includes a pixel and a driving circuit including a gate driving circuit electrically connected to the pixel. The pixel includes a light emitting element, a first transistor including a first electrode electrically connected to a first voltage line, a second electrode electrically connected to the light emitting element, and a gate electrode connected to a first node, a second transistor including a first electrode connected to a data line, a second electrode, and a gate electrode connected to the first scan line, a third transistor including a first electrode electrically connected to the first node, a second electrode connected to the second electrode of the first transistor, and a gate electrode connected to the second scan line, and a test transistor including a first electrode connected to the first electrode of the first transistor, a second electrode electrically connected to the second electrode of the second transistor, and a gate electrode connected to the second scan line.

In an embodiment, the first scan line may receive a first scan signal. The second scan line may receive a second scan signal.

In an embodiment, the pixel may further include a first capacitor connected between the first voltage line and a second node, a second capacitor connected between the first node and the second node, a fourth transistor connected between the second node and the second electrode of the second transistor and including a gate electrode connected to a fourth scan line, and a fifth transistor connected between the first node and the first electrode of the third transistor and including a gate electrode connected to the fourth scan line.

In an embodiment, the pixel may further include a sixth transistor connected between the first electrode of the first transistor and a bias line, and comprising a gate electrode connected to a fifth scan line.

In an embodiment, at least one of the first to third transistors may be a P-type transistor, and each of the test transistor, the fourth transistor and the fifth transistor may be an N-type transistor.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
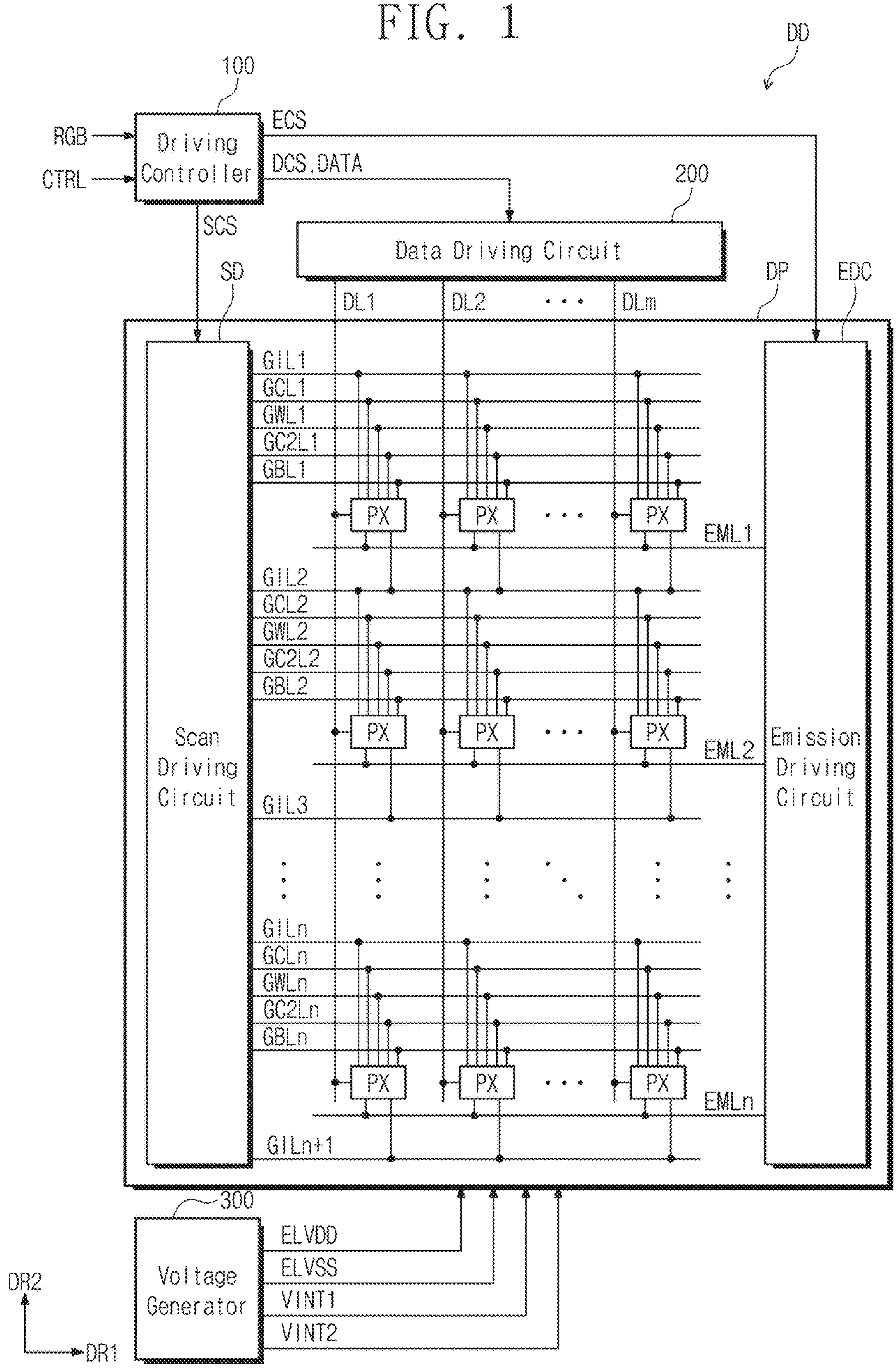
FIG. 1 is a block diagram of a display device, according to an embodiment of the present disclosure.

In the specification, the expression that a first component (or region, layer, part, etc.) is "on", "connected to", or "coupled to" a second component means that the first component is directly on, connected to, or coupled with the second component or means that a third component is interposed therebetween.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device, according to an embodiment of the present disclosure.

Referring to FIG. 1, a display device DD includes a display panel DP, a driving controller 100, a data driving circuit 200, and a voltage generator 300.

The driving controller 100 receives an input image signal RGB and a control signal CTRL. The driving controller 100 generates an output image signal DATA by converting a data format of the input image signal RGB so as to be suitable for the interface specification of the data driving circuit 200. The driving controller 100 outputs a scan control signal SCS, a data control signal DCS, and an emission driving control signal ECS.

The data driving circuit 200 receives the data control signal DCS and the output image signal DATA from the driving controller 100. The data driving circuit 200 converts the output image signal DATA into data signals and then outputs the data signals to a plurality of data lines DLI to DLm to be described later. The data signals refer to analog voltages corresponding to a grayscale value of the output image signal DATA.

In an embodiment, the data driving circuit 200 may output one of a data signal corresponding to the output image signal DATA and a bias signal corresponding to a predetermined voltage level to data lines DLI to DLm.

The voltage generator 300 generates voltages necessary to operate the display panel DP. In an embodiment, the voltage generator 300 generates a first driving voltage ELVDD (or a first voltage), a second driving voltage ELVSS (or a second voltage), a first initialization voltage VINT1 (or a third voltage), and a second initialization voltage VINT2 (or a fourth voltage). In an embodiment, the first initialization voltage VINT1 and the second initialization voltage VINT2 may have voltage levels different from each other. In an embodiment, the first initialization voltage VINT1 may have the same voltage level as the second initialization voltage VINT2.

The display panel DP includes scan lines GIL1 to GILn+1, GCL1 to GCLn, GWL1 to GWLn, GC2L1 to GC2Ln, and GBL1 to GBLn, emission control lines EML1 to EMLn, data lines DLI to DLm, and pixels PX. The display panel DP may further include a scan driving circuit SD and an emission driving circuit EDC. In an embodiment, the scan driving circuit SD may be arranged on a first side of the display panel DP. The scan lines GIL1 to GILn+1, GCL1 to GCLn, GWL1 to GWLn, GC2L1 to GC2Ln, and GBL1 to GBLn extend from the scan driving circuit SD in a first direction DR1.

The emission driving circuit EDC is arranged on a second side of the display panel DP. The emission control lines EML1 to EMLn extend from the emission driving circuit EDC in a direction opposite to the first direction DR1.

The scan lines GIL1 to GILn+1, GCL1 to GCLn, GWL1 to GWLn, GC2L1 to GC2Ln, and GBL1 to GBLn and the emission control lines EML1 to EMLn are arranged spaced from one another in a second direction DR2. The data lines DLI to DLm extend from the data driving circuit 200 in a direction opposite to the second direction DR2, and are arranged spaced from one another in the first direction DR1.

In the example shown in FIG. 1, the scan driving circuit SD and the emission driving circuit EDC are arranged to face each other with the pixels PX interposed therebetween, but the present disclosure is not limited thereto. For example, the scan driving circuit SD and the emission driving circuit EDC may be disposed adjacent to each other on one of the first side and the second side of the display panel DP. In an embodiment, the scan driving circuit SD and the emission driving circuit EDC may be implemented with one circuit.

The plurality of pixels PX are electrically connected to the scan lines GIL1 to GILn+1, GCL1 to GCLn, GWL1 to GWLn, GC2L1 to GC2Ln, and GBL1 to GBLn, the emission control lines EML1 to EMLn, and the data lines DLI to DLm. Each of the plurality of pixels PX may be electrically connected to six scan lines and one emission control line. For example, as shown in FIG. 1, a first row of pixels may be connected to the scan lines GIL1, GCL1, GWL1, GC2L1, GBL1, and GIL2 and the emission control line EML1. Also, the second row of pixels may be connected to the scan lines GIL2, GCL2, GWL2, GC2L2, GBL2, and GIL3 and the emission control line EML2.

Each of the plurality of pixels PX includes a light emitting element ED (see FIG. 2) and a pixel circuit for controlling the emission of the light emitting element ED. The pixel circuit may include one or more transistors and one or more capacitors. The scan driving circuit SD and the emission driving circuit EDC may include transistors formed through the same processes as the processes for forming transistors of the pixel circuit.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SD receives the scan control signal SCS from the driving controller 100. The scan driving circuit SD may output scan signals to the scan lines GIL1 to GILn+1, GCL1 to GCLn, GWL1 to GWLn, GC2L1 to GC2Ln, and GBL1 to GBLn in response to the scan control signal SCS.

The emission driving circuit EDC may output emission control signals to emission control lines EML1 to EMLn in response to the emission driving control signal ECS from the driving controller 100.

The driving controller 100 according to an embodiment of the present disclosure may determine an operating mode and an operating frequency and may control the data driving circuit 200, the scan driving circuit SD, and the emission driving circuit EDC depending on the determined operating frequency.

The driving controller 100, the data driving circuit 200, the scan driving circuit SD, and the emission driving circuit EDC may be referred to as a "driving circuit" that drives the data lines DLI to DLm, the scan lines GIL1 to GILn+1, GCL1 to GCLn, GWL1 to GWLn, GC2L1 to GC2Ln, and GBL1 to GBLn, and the emission control lines EML1 to EMLn, which are electrically connected to the pixels PX.

Figure 2:
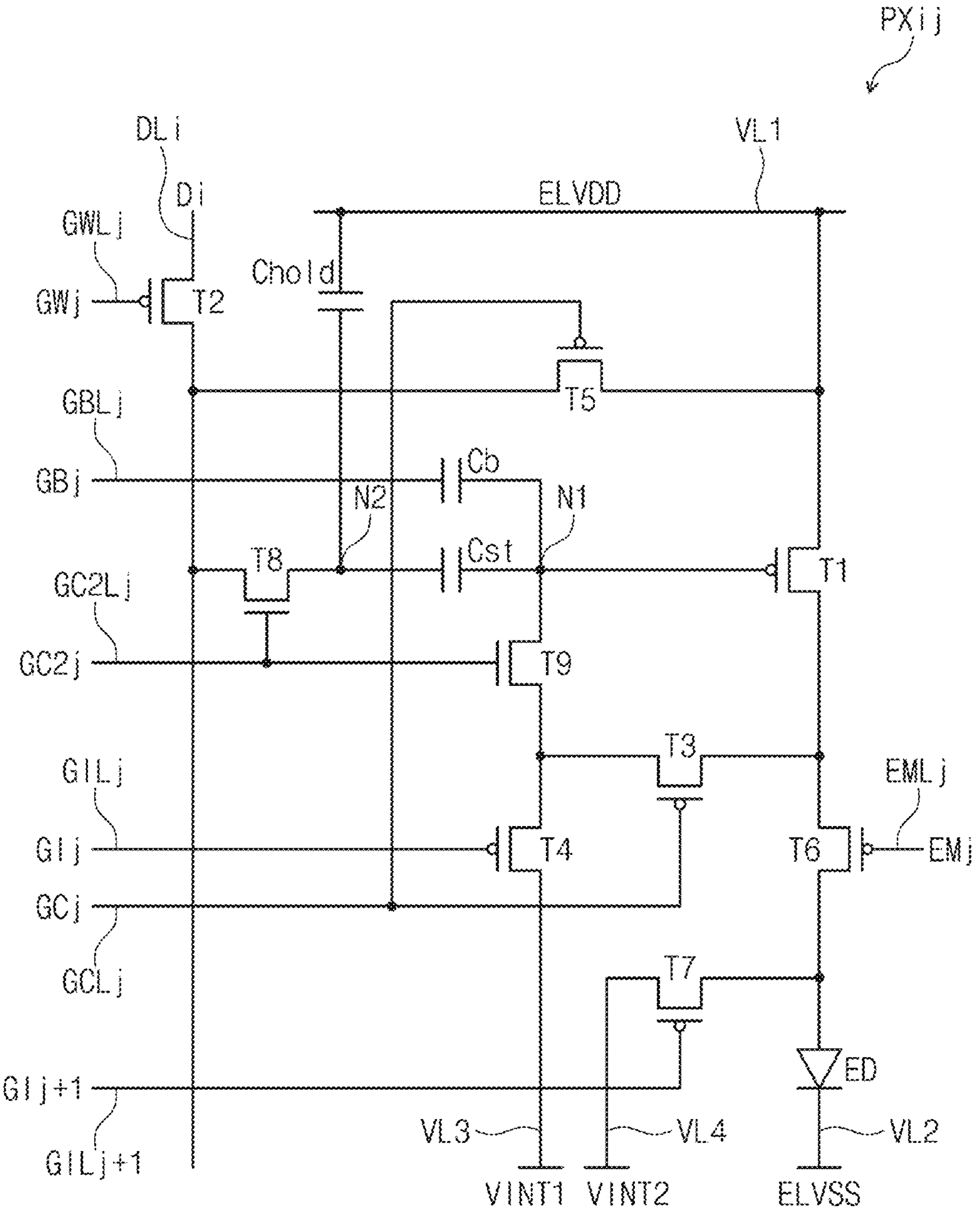
FIG. 2 is a circuit diagram of a pixel according to an embodiment of the present disclosure.

FIG. 2 is a circuit diagram of a pixel, according to an embodiment of the present disclosure.

FIG. 2 illustrates a circuit diagram of a pixel PXij connected to the i-th data line DLi among the data lines DLI to DLm, the j-th scan lines GILj, GCLj, GWLj, GC2Lj, and GBLj and the (j+1)-th scan line GILj+1 among the scan lines GIL1 to GILn+1, GCL1 to GCLn, GWL1 to GWLn, GC2L1 to GC2Ln, and GBL1 to GBLn, and the j-th emission control line EMLj among the emission control lines EML1 to EMLn, which are illustrated in FIG. 1.

Each of the plurality of pixels PX shown in FIG. 1 may have the same circuit configuration as the circuit diagram of the pixel PXij shown in FIG. 2.

Referring to FIG. 2, the pixel PXij of a display device according to an embodiment includes at least one light emitting element ED and a pixel circuit. The pixel circuit may include first to ninth transistors T1, T2, T3, T4, T5, T6, T7, T8, and T9 and first to third capacitors Cst, Chold, and Cb. In an embodiment, the light emitting element ED may be a light emitting diode.

In an embodiment, some of the first to ninth transistors T1 to T9 are P-type transistors having LTPS as a semiconductor layer. The other(s) thereof may be an N-type transistor having an oxide semiconductor as a semiconductor layer.

In an embodiment, each of the first to seventh transistors T1 to T7 is a P-type transistor, and each of the eighth transistor T8 and the ninth transistor T9 is an N-type transistor.

A circuit configuration of the pixel PXij according to an embodiment of the present disclosure is not limited to an embodiment in FIG. 2. The pixel PXij illustrated in FIG. 2 is only an example, and the circuit configuration of the pixel PXij may be modified and implemented.

The scan lines GILj, GCLj, GWLj, GC2Lj, GBLj, and GILj+1 may deliver scan signals GIj, GCj, GWj, GC2*j*, GBj, and GIj+1, respectively. The emission control line EMLj may deliver an emission control signal EMj. The data line DLi delivers a data signal Di. The data signal Di may have a voltage level corresponding to the input image signal RGB that is input to the display device DD (see FIG. 1). The first to fourth voltage lines VL1, VL2, VL3, and VL4 may deliver the first driving voltage ELVDD, the second driving voltage ELVSS, the first initialization voltage VINT1, and the second initialization voltage VINT2, respectively. The third voltage line VL3 and the fourth voltage line VL4 may be referred to as "a first initialization voltage line" and "a second initialization voltage line", respectively.

The first transistor T1 includes a first electrode electrically connected to the first voltage line VL1, a second electrode electrically connected to an anode of the light emitting element ED via the sixth transistor T6, and a gate electrode connected to a first node N1.

The second transistor T2 includes a first electrode connected to the data line DLi, a second electrode, and a gate electrode connected to the scan line GWLj.

The third transistor T3 includes a first electrode connected to the second electrode of the first transistor T1, a second electrode, and a gate electrode connected to the scan line GCLj.

The fourth transistor T4 includes a first electrode connected to the second electrode of the third transistor T3, a second electrode connected to the third voltage line VL3, through which the first initialization voltage VINT1 is delivered, and a gate electrode connected to the scan line GILj.

The fifth transistor T5 includes a first electrode connected to the first electrode of the first transistor T1, a second electrode connected to the second electrode of the second transistor T2, and a gate electrode connected to the scan line GCLj. The fifth transistor T5 may be referred to as a "test transistor". In the example shown in FIG. 2, the gate electrode of the fifth transistor T5 is connected to the scan line GCLj, but the present disclosure is not limited thereto. In an embodiment, the gate electrode of the fifth transistor T5 may be connected to another scan line other than the scan line GCLj.

The sixth transistor T6 includes a first electrode connected to the second electrode of the first transistor T1, a second electrode connected to the anode of the light emitting element ED, and a gate electrode connected to the emission control line EMLj.

The seventh transistor T7 includes a first electrode connected to the anode of the light emitting element ED, a second electrode connected to the fourth voltage line VLA, and a gate electrode connected to the scan line GILj+1. The seventh transistor T7 may be turned on in response to the scan signal GIj+1 received through the scan line GILj+1 such that the fourth voltage line VLA is electrically connected to the anode of the light emitting element ED. Accordingly, the current of the anode of the light emitting element ED may be bypassed to the fourth voltage line VLA through the seventh transistor T7.

The eighth transistor T8 includes a first electrode connected to the second electrode of the second transistor T2, a second electrode connected to a second node N2, and a gate electrode connected to the scan line GC2Lj.

The ninth transistor T9 includes a first electrode connected to the gate electrode of the first transistor T1, a second electrode connected to the second electrode of the third transistor T3, and a gate electrode connected to the scan line GC2Lj.

The first capacitor Cst is connected between the first node N1 and the second node N2.

The second capacitor Chold is connected between the first voltage line VL1 and the second node N2.

The third capacitor Cb is connected between the first node N1 and the scan line GBLj.

In an embodiment, the pixel PXij may operate in one of a normal mode and a test mode. In the normal mode, the pixel PXij may operate at one of a first operating frequency and a second operating frequency. The second operating frequency may be lower than the first operating frequency. In an embodiment, the first operating frequency may be 120 Hz, and the second operating frequency may be 60 Hz.

In the test mode, the pixel PXij may operate at the first operating frequency. However, the present disclosure is not limited thereto. For example, the pixel PXij may operate in another operating mode as well as the normal mode and the test mode, and may operate at various operating frequencies as well as the first and second operating frequencies. Also, in the test mode, the pixel PXij may operate at a frequency lower or higher than the first operating frequency.

FIG. 3A is a timing diagram of scan signals and an emission control signal for describing an operation of a pixel when an operating frequency is a first operating frequency.

Figure 3:
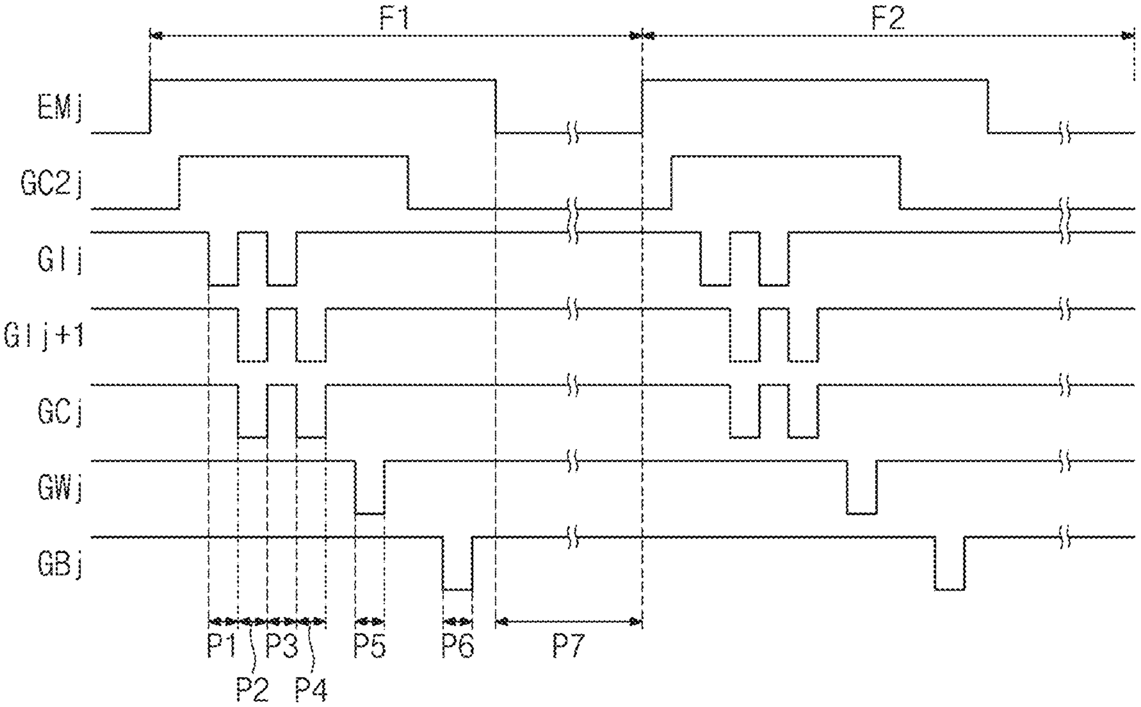
FIG. 3 is a timing diagram of scan signals and an emission control signal for describing an operation of a pixel when an operating frequency is a first operating frequency.

FIGS. 4A to 4E are diagrams for describing an operation of a pixel in the first to seventh periods illustrated in FIG. 3.

In FIG. 3, first to seventh periods P1 to P7 mean operating states or operating periods of the pixel PXij.

Figure 4A:
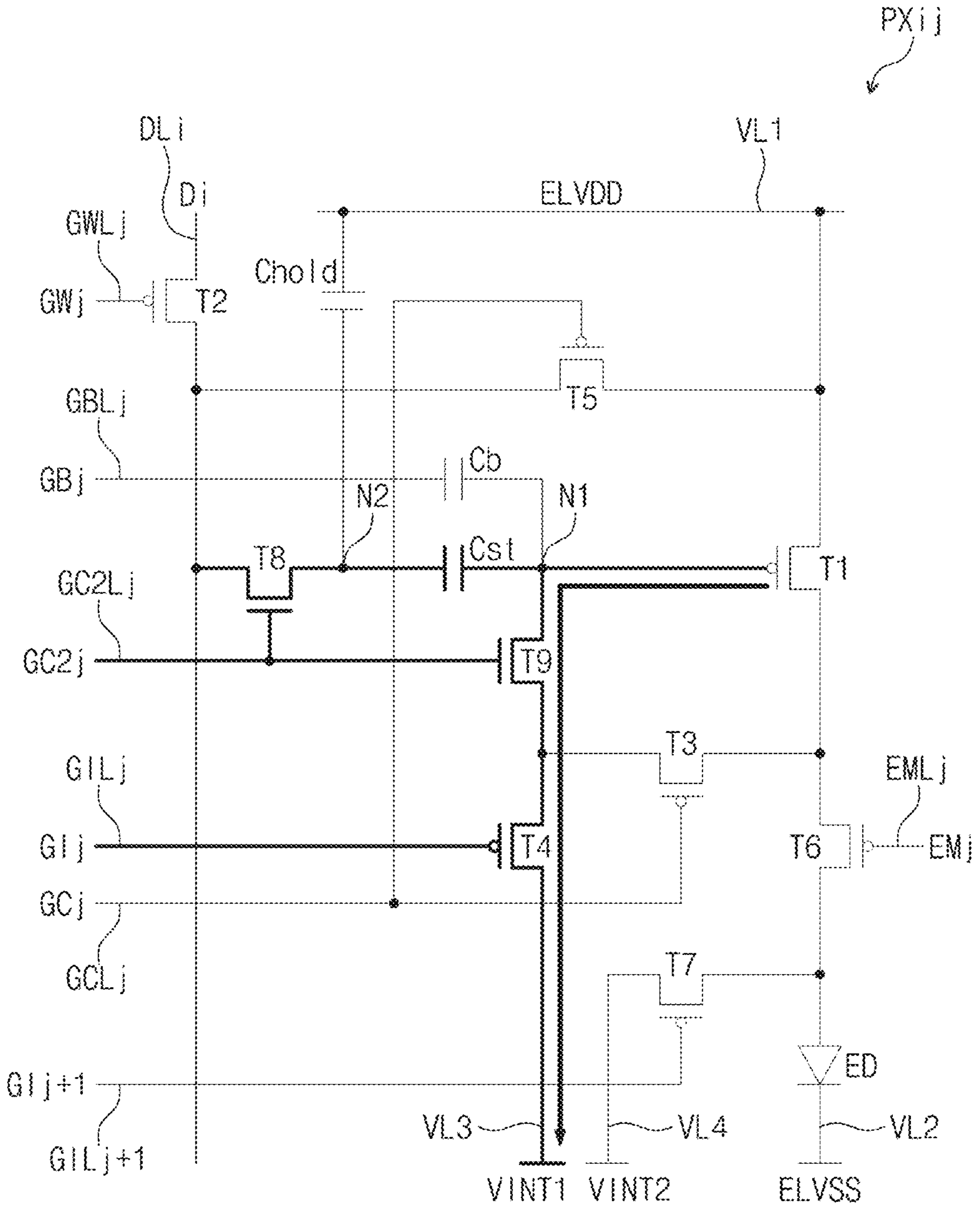
FIGS. 4A, 4B, 4C, 4D and 4E are diagrams for describing an operation of a pixel in the first to seventh periods illustrated in FIG. 3.

Referring to FIGS. 3 and 4A, when the scan signal GC2*j* is at a high level during first to fifth periods P1 to P5 of a first frame F1, the eighth transistor T8 and the ninth transistor T9 are turned on during the first to fifth periods P1 to P5.

When the scan signal GIj is at a low level during each of the first period P1 and the third period P3, the fourth transistor T4 is turned on. Accordingly, the first initialization voltage VINT1 may be delivered to the first node N1 (i.e., a gate electrode of the first transistor T1) through the fourth transistor T4 and the ninth transistor T9. The first initialization voltage VINT1 may be a voltage for initializing the gate electrode of the first transistor T1 and a first end of the capacitor Cst, that is, the first node N1.

The first period P1 and the third period P3 may be initialization periods for initializing the gate electrode of the first transistor T1.

Figure 4B:
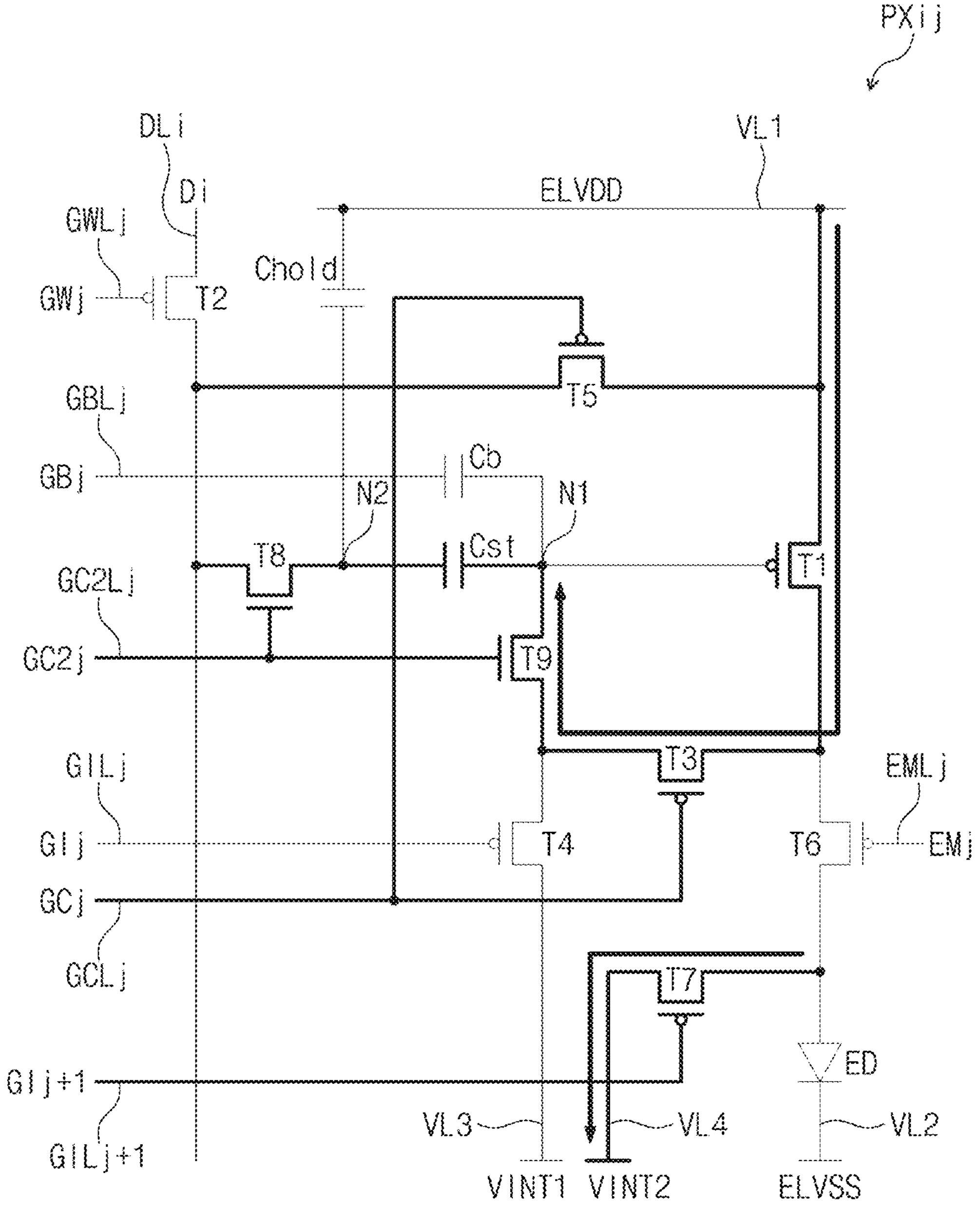

Referring to FIGS. 3 and 4B, when the scan signal GCj is at a low level during each of the second period P2 and the fourth period P4, the third transistor T3 is turned on. Accordingly, a voltage obtained by subtracting a threshold voltage of the first transistor T1 from the first driving voltage ELVDD may be provided to the first end of the first capacitor Cst through the third transistor T3.

In the meantime, when the scan signal GIj+1 is at a low level during each of the second period P2 and the fourth period P4, the seventh transistor T7 is turned on. Accordingly, when the seventh transistor T7 is turned on, the anode of the light emitting element ED and the fourth voltage line VL4 may be electrically connected to each other. The second initialization voltage VINT2 provided through the fourth voltage line VL4 may be a voltage for initializing the anode of the light emitting element ED.

Each of the second period P2 and the fourth period P4 may be a compensation and anode-initialization period for compensating for the threshold voltage (referred to as "Vth") of the first transistor T1 and initializing the anode of the light emitting element ED to the second initialization voltage VINT2.

The pixel PXij that alternately repeats the first period P1 and the third period P3 for initializing the gate electrode of the first transistor T1 and the second period P2 and the fourth period P4 for compensating for the threshold voltage Vth of the first transistor T1 and bypassing the current of the anode of the light emitting element ED may sufficiently secure initialization and compensation time. Accordingly, the data signal Di in the previous frame may have a minimal effect on the current frame.

FIG. 3 shows that the pixel PXij alternately performs an initialization period and a compensation period twice, but the present disclosure is not limited thereto. The number of times that the initialization period is repeated and the number of times that the compensation period is repeated may be variously changed.

Figure 4C:
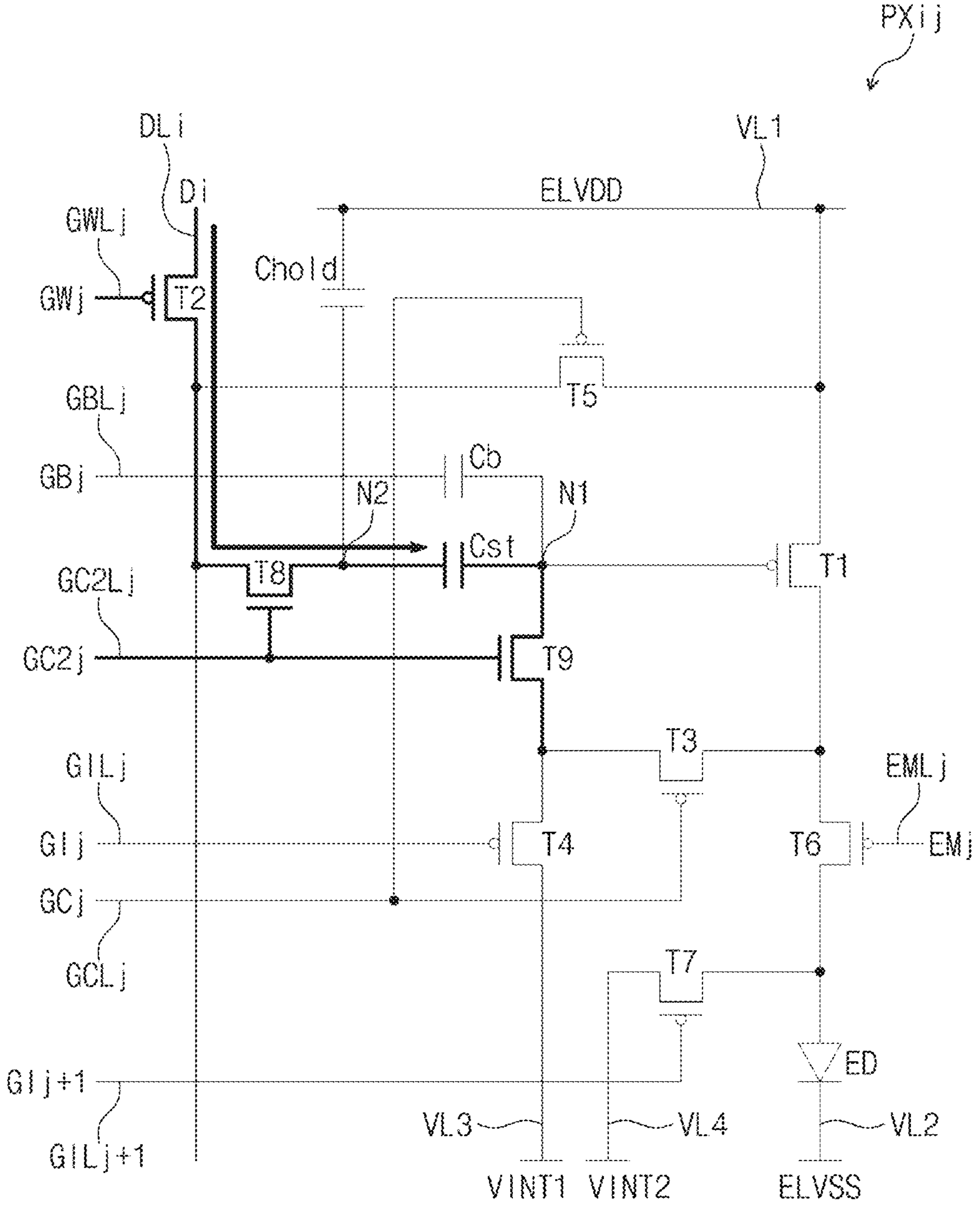

Referring to FIGS. 3 and 4C, when the scan signal GWj transitions to a low level during the fifth period P5, the second transistor T2 is turned on. A voltage level corresponding to the data signal Di of the data line DLi may be provided to the second node N2 through the second transistor T2 and the eighth transistor T8.

The fifth period P5 may be a write period for providing a voltage level corresponding to the data signal Di to a second end of the first capacitor Cst.

When the fifth period P5 ends, the scan signal GC2*j* transitions from a high level to a low level.

Figure 4D:
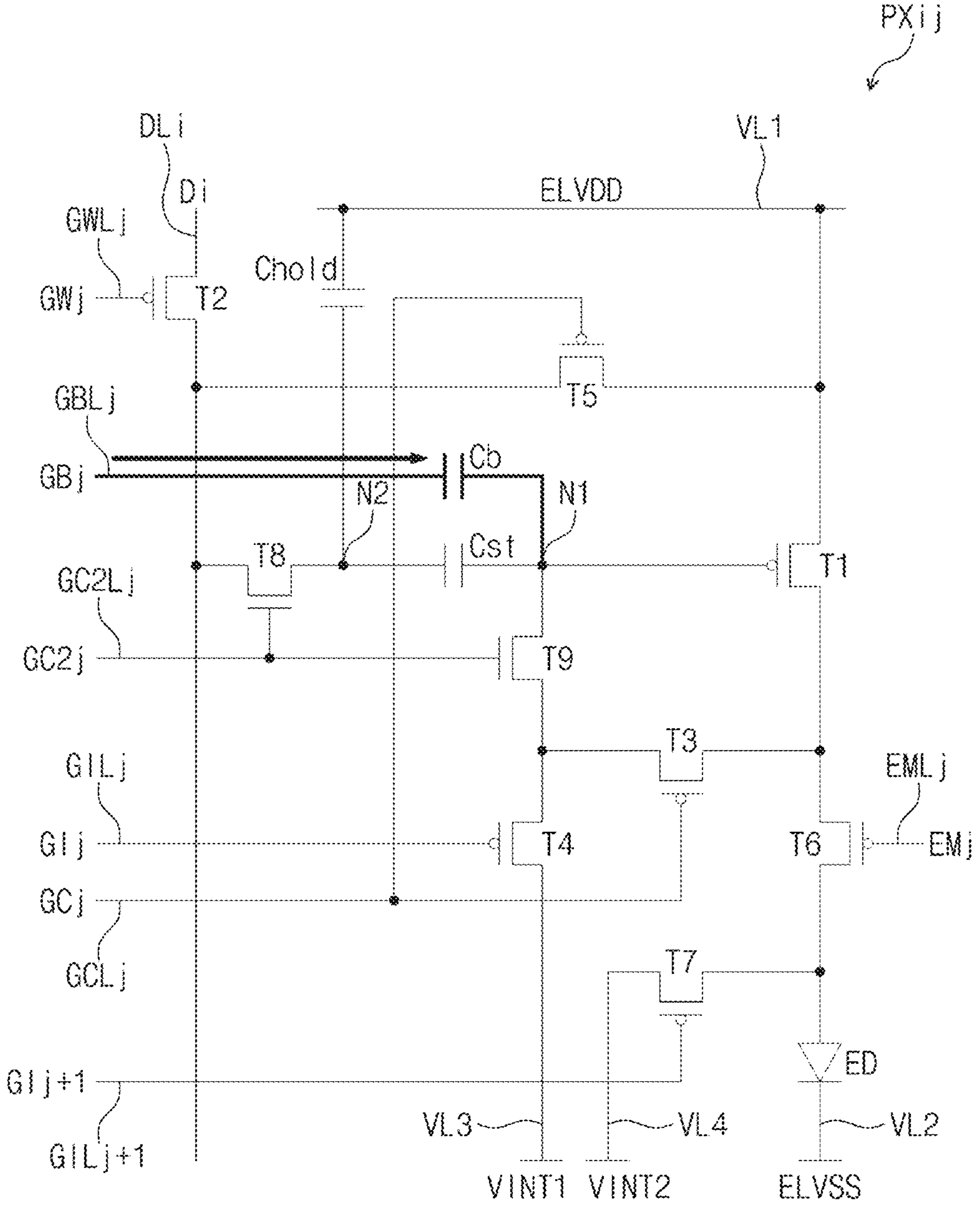

Referring to FIGS. 3 and 4D, when the scan signal GBj transitions to the low level during the sixth period P6, the voltage level of the gate electrode of the first transistor T1 may be lowered by the voltage level of the scan signal GBj. The voltage level of the gate electrode of the first transistor T1 may be initialized by the scan signal GBj. The sixth period P6 may be an initialization period for initializing the gate electrode of the first transistor T1.

Figure 4E:
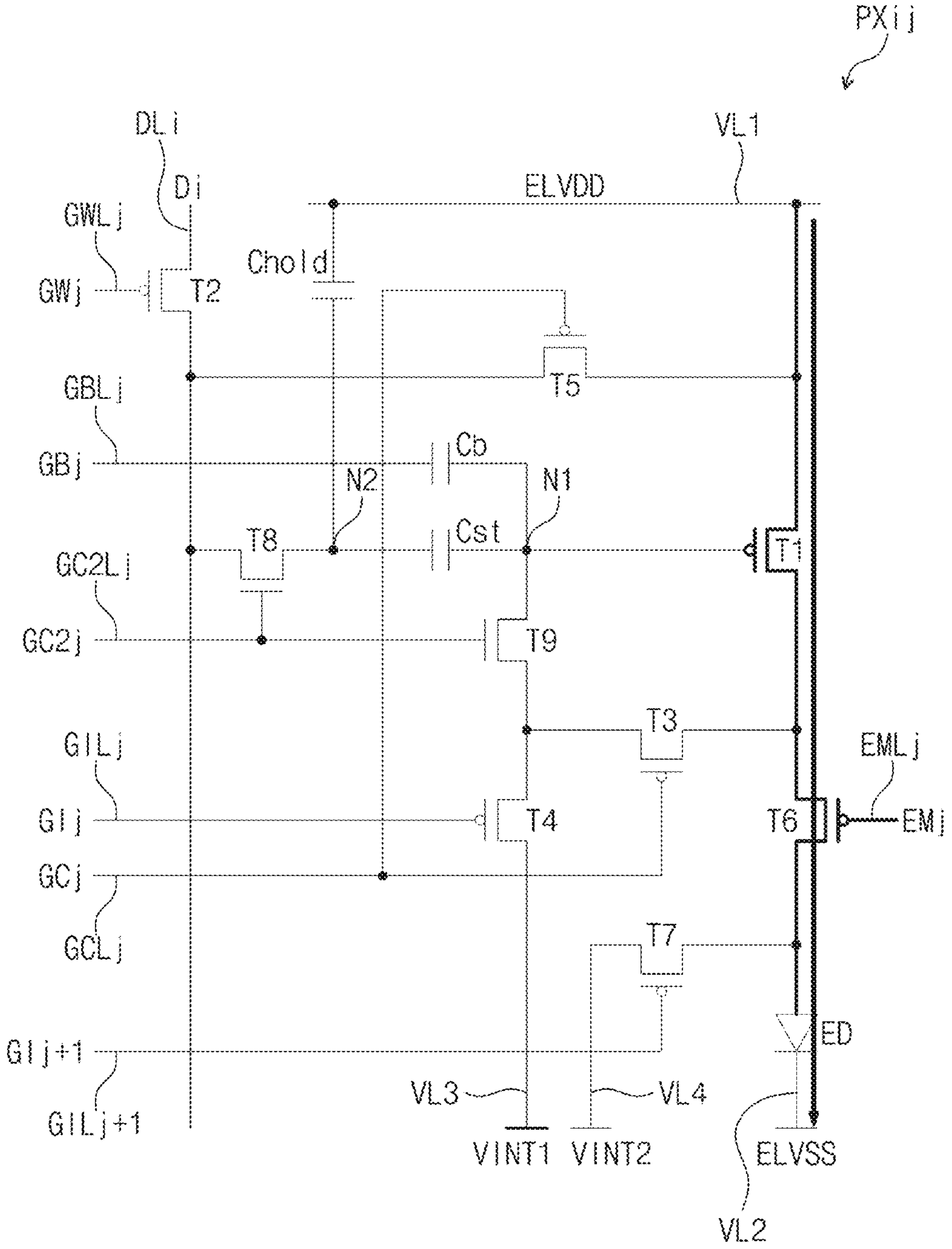

Referring to FIGS. 3 and 4E, when the emission control signal EMj transitions to a low level during the seventh period P7, a current path may be formed from the first voltage line VL1 to the second voltage line VL2 through the first transistor T1, the sixth transistor T6, and the light emitting element ED.

The seventh period P7 may be an emission period of the light emitting element ED.

Because the scan signal GC2*j* is at a low level during the seventh period P7 that is the emission period, the eighth transistor T8 and the ninth transistor T9 are turned off. In an embodiment, the eighth transistor T8 and the ninth transistor T9 are N-type transistors, a leakage current may be minimized compared to a P-type transistor. Accordingly, a voltage between opposite ends of the first capacitor Cst may be maintained uniformly during the emission period.

The pixel PXij may operate during the second frame F2 of the normal mode in the same manner as the pixel PXij during the first frame F1 of the normal mode.

Figure 5:
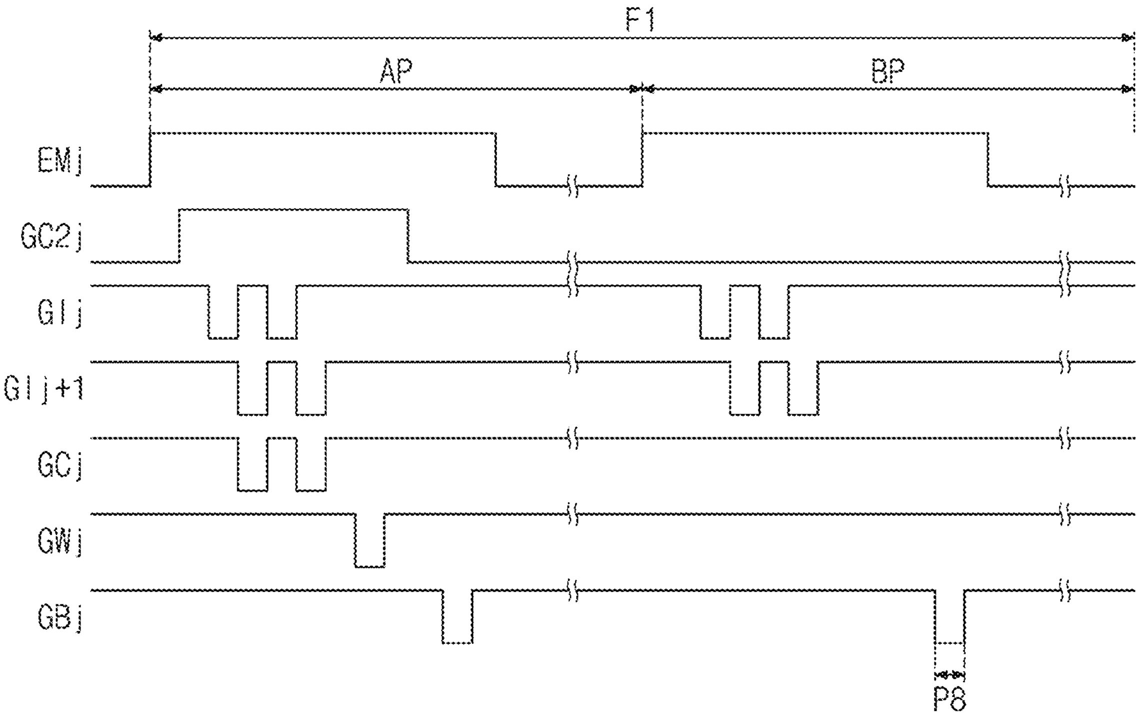
FIG. 5 is a timing diagram of scan signals and an emission control signal for describing an operation of the pixel shown in FIG. 2 when an operating frequency of a normal mode is a second operating frequency.

FIG. 5 is a timing diagram of scan signals and an emission control signal for describing an operation of the pixel shown in FIG. 2 when an operating frequency of a normal mode is a second operating frequency.

Referring to FIGS. 2 and 5, during the second operating frequency of the normal mode, the first frame F1 includes an active period AP and a blank period BP.

The pixel PXij may operate during the active period AP in the same manner as the pixel PXij during the first frame F1 shown in FIG. 3.

The pixel PXij does not receive the valid data signal Di during the blank period BP. That is, during the blank period BP, each of the scan signals GC2*j*, GCj, and GWj is maintained at an inactive level.

When the scan signal GBj transitions to a low level during an eighth period P8, the voltage level of the gate electrode of the first transistor T1 may be lowered by the third capacitor Cb by a voltage level of the scan signal GBj. That is, the gate electrode of the first transistor T1 is initialized by the scan signal GBj. Accordingly, it is possible to minimize a change in luminance of the light emitting element ED due to a hysteresis characteristic of the first transistor T1.

Figure 6:
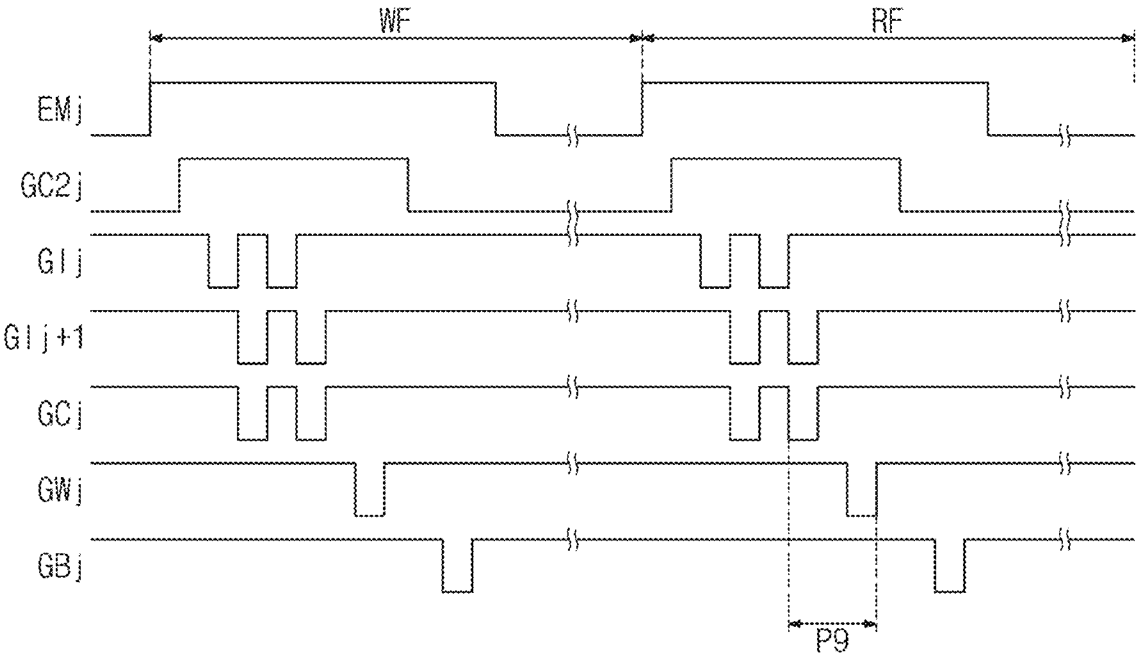
FIG. 6 is a timing diagram of scan signals and an emission control signal for describing an operation of the pixel shown in FIG. 2 in a test mode.

FIG. 6 is a timing diagram of scan signals and an emission control signal for describing an operation of the pixel shown in FIG. 2 in a test mode.

Figure 7:
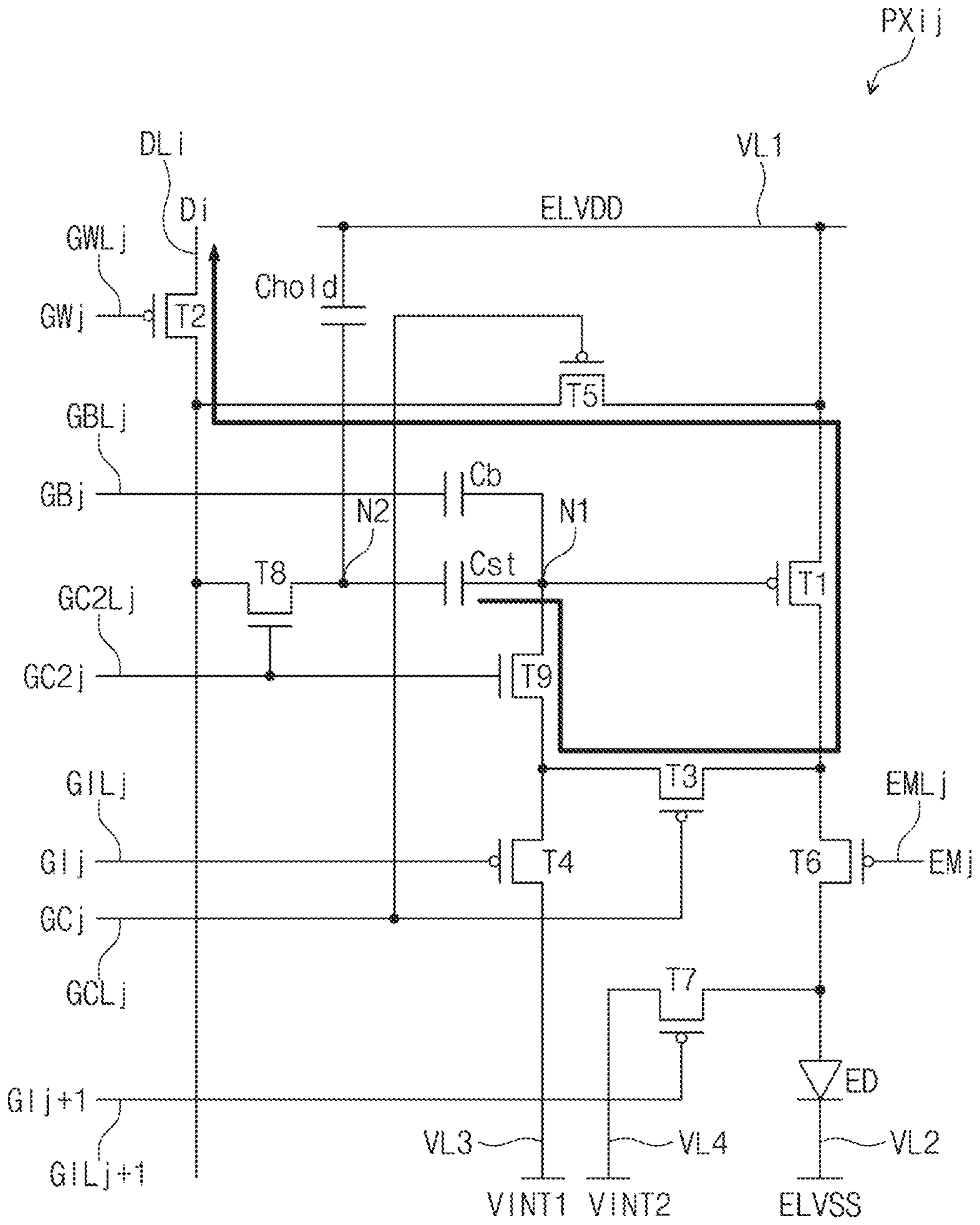
FIG. 7 is a diagram for describing an operation of a pixel in a ninth period shown in FIG. 6.

FIG. 7 is a diagram for describing an operation of a pixel in a ninth period shown in FIG. 6.

Referring to FIGS. 6 and 7, in a test mode, the pixel PXij may operate during a write frame WF and a read frame RF.

The pixel PXij may operate during the write frame WF in the same manner as the pixel PXij during the first frame F1 in the normal mode shown in FIG. 3.

That is, a voltage corresponding to the data signal Di provided through the data line DLi during the write frame WF is provided to the second end of the first capacitor Cst.

Similarly to the first frame F1 of the normal mode shown in FIG. 3, the pixel PXij may operate during the read frame RF. However, during the read frame RF, the valid data signal Di may not be provided through the data line DLi, and a signal corresponding to the voltage level of the first node N1 may be provided to the data line DLi.

When the scan signal GCj transitions to a low level during a ninth period P9, the third transistor T3 and the fifth transistor are turned on. A signal corresponding to the voltage level of the first node N1 may be provided to the second electrode of the second transistor T2 through the ninth transistor T9, the third transistor T3, the first transistor T1, and the fifth transistor T5.

When the scan signal GWj transitions to a low level during the ninth period P9, the second transistor T2 may be turned on, and the signal of the second electrode of the second transistor T2 may be provided to a test device (not shown) through the data line DLi.

The test device may detect a voltage level received through the data line DLi. The test device may test a state of the pixel PXij by comparing a voltage level of the data signal Di provided to the data line DLi during the write frame WF with a voltage level of a signal received from the data line DLi during the read frame RF.

In detail, the data line DLi may be electrically connected to the first electrode of the first transistor T1 through the second transistor T2 and the fifth transistor T5, and thus the test device may detect the voltage level of the first node N1.

In the test mode, the scan signals GIj, GCj, GWj, GC2*j*, GBj, and GIj+1 and the emission control signal EMj shown in FIG. 6 are only examples and may be variously changed.

For example, in the test mode, the scan signals GIj, GC2*j*, GBj, and GIj+1 and the emission control signal EMj are maintained at an inactive level, and the scan signals GCj and GWj may be sequentially transitioned to a low level. In this case, the first driving voltage ELVDD may be delivered to the data line DLi through the fifth transistor T5 and the second transistor T2.

The test device may identify a voltage level of the first driving voltage ELVDD provided to the pixel PXij by detecting a voltage level received from the data line DLi.

The fifth transistor T5 may be a test transistor. In an embodiment, the fifth transistor T5 is a P-type transistor, but the present disclosure is not limited thereto. The fifth transistor T5 may be an N-type transistor.

Returning to FIG. 4B, when the scan signal GCj transitions to a low level in the normal mode, the fifth transistor T5 may be turned on, and a voltage level of the first node N1 may be provided to the second electrode of the second transistor T2.

Referring to FIG. 4C, when the data signal Di is provided to the data line DLi in a normal mode, the second transistor T2 is turned on by the scan signal GWj. A voltage level corresponding to the data signal Di may be provided to the second end of the first capacitor Cst through the eighth transistor T8. At this time, the scan signal GCj is at a high level, and thus the fifth transistor T5 maintains a turn-off state. Accordingly, in the normal mode, the fifth transistor T5 does not affect an operation of the pixel PXij.

Figure 8:
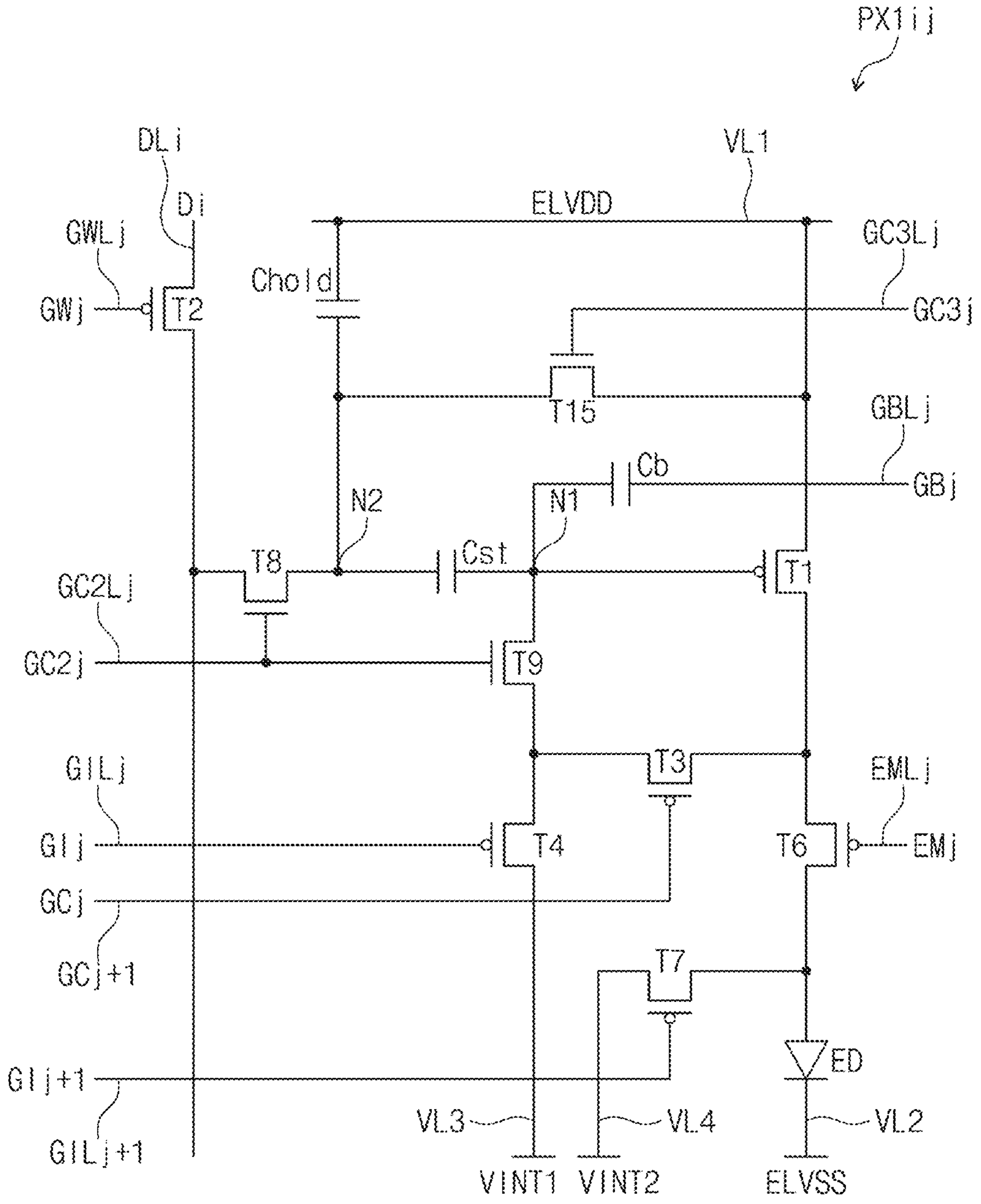
FIG. 8 is a circuit diagram of a pixel, according to an embodiment of the present disclosure.

FIG. 8 is a circuit diagram of a pixel, according to an embodiment of the present disclosure.

A pixel PX1*ij* illustrated in FIG. 8 includes a configuration similar to the pixel PXij shown in FIG. 2, and thus the same reference numerals are used for the same components, and additional descriptions are omitted to avoid redundancy.

Referring to FIG. 8, a test transistor T15 is connected between the first electrode of the first transistor T1 and the second node N2. The gate electrode of the test transistor T15 is connected to a scan line GC3Lj.

Figure 9A:
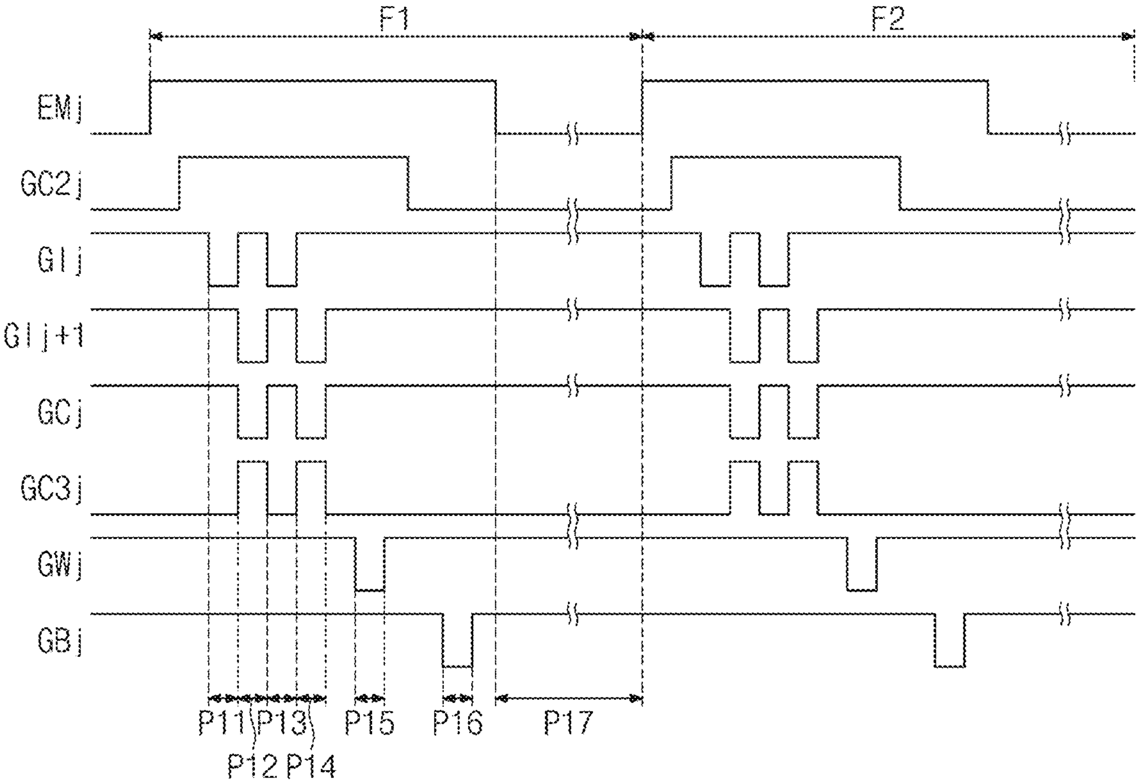
FIG. 9A is a timing diagram of scan signals and an emission control signal for describing an operation of the pixel shown in FIG. 8 when an operating frequency of a normal mode is a first operating frequency.

FIG. 9A is a timing diagram of scan signals and an emission control signal for describing an operation of the pixel shown in FIG. 8 when an operating frequency of a normal mode is a first operating frequency.

Figure 9B:
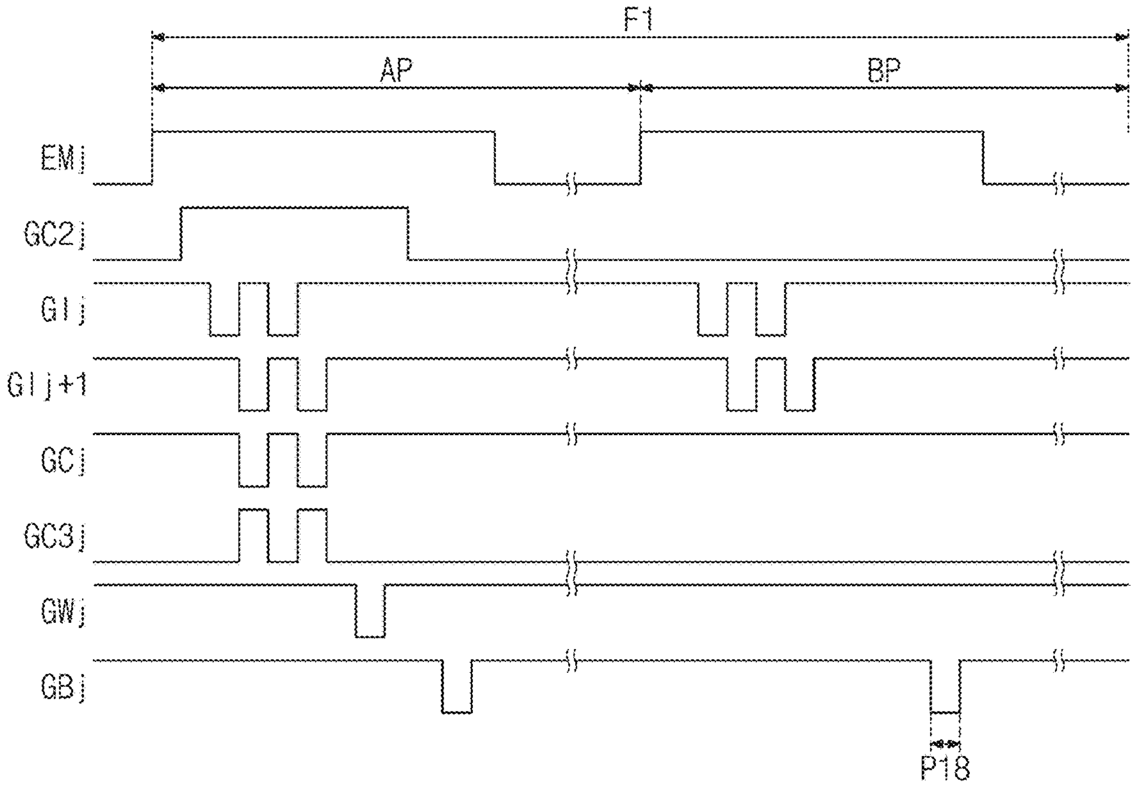
FIG. 9B is a timing diagram of scan signals and an emission control signal for describing an operation of the pixel shown in FIG. 8 when an operating frequency of a normal mode is a second operating frequency.

FIG. 9B is a timing diagram of scan signals and an emission control signal for describing an operation of the pixel shown in FIG. 8 when an operating frequency of a normal mode is a second operating frequency.

Figure 9C:
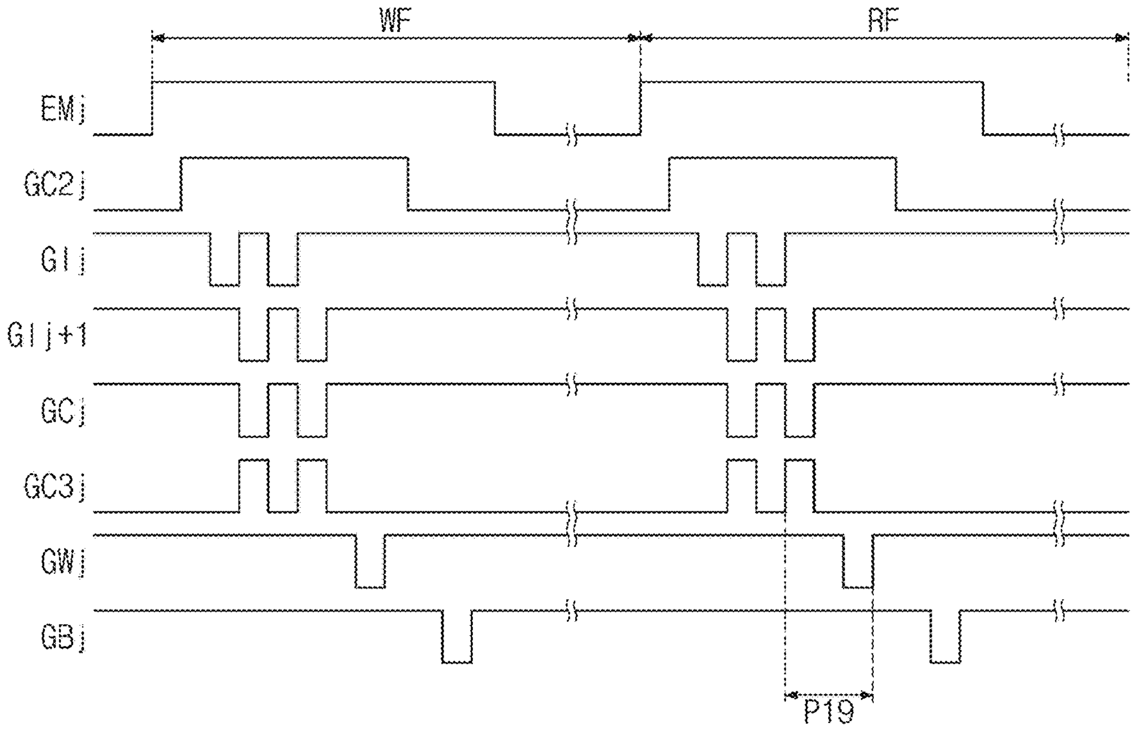
FIG. 9C is a timing diagram of scan signals and an emission control signal for describing an operation of the pixel shown in FIG. 8 in a test mode.

FIG. 9C is a timing diagram of scan signals and an emission control signal for describing an operation of the pixel shown in FIG. 8 in a test mode.

In FIGS. 9A to 9C, each of eleventh to nineteenth periods P11 to P19 mean an operating state or operating period of the pixel PX1*ij*.

Referring to FIGS. 8 and 9A, each of the eleventh period P11 and the thirteenth period P13 of the first frame F1 may be an initialization period for initializing the gate electrode of the first transistor T1 to the first initialization voltage VINT1.

Each of the second period P12 and the fourth period P14 may be a compensation and anode-initialization period for compensating for the threshold voltage Vth of the first transistor T1 and initializing an anode of the light emitting element ED.

When a scan signal GC3*j* transitions to a high level during each of the twelfth period P12 and the fourteenth period P14, the test transistor T15 is turned on. As the test transistor T15 is turned on, the second node N2 may be initialized to the first driving voltage ELVDD.

The fifteenth period P15 may be a write period for providing a voltage level corresponding to the data signal Di to the second end of the first capacitor Cst.

The sixteenth period P16 may be an initialization period for initializing the gate electrode of the first transistor T1.

The seventeenth period P17 may be an emission period of the light emitting element ED.

Referring to FIGS. 8 and 9B, during the second operating frequency of the normal mode, the first frame F1 includes an active period AP and a blank period BP.

The pixel PX1ij may operate during the active period AP in the same manner as the pixel PX1ij during the first frame F1 shown in FIG. 9A.

The pixel PX1ij does not receive the valid data signal Di during the blank period BP. That is, during the blank period BP, each of the scan signals GC2j, GCj, GC3j, and GWj is maintained at an inactive level.

When the scan signal GBj transitions to a low level during the eighteenth period P18, the voltage level of the gate electrode of the first transistor T1 may be lowered by the third capacitor Cb by a voltage level of the scan signal GBj. That is, the gate electrode of the first transistor T1 is initialized by the scan signal GBj. Accordingly, it is possible to minimize a change in luminance of the light emitting element ED due to a hysteresis characteristic of the first transistor T1.

Referring to FIGS. 8 and 9C, in a test mode, the pixel PX1ij may operate during a write frame WF and a read frame RF.

The pixel PX1ij may operate during the write frame WF in the same manner as the pixel PX1ij during the first frame F1 in the normal mode shown in FIG. 9A.

Similarly to the first frame F1 of the normal mode shown in FIG. 9A, the pixel PX1ij may operate during the read frame RF. However, during the read frame RF, the valid data signal Di may not be provided through the data line DLi, and a signal corresponding to the voltage level of the first node N1 may be provided to the data line DLi.

Figure 10:
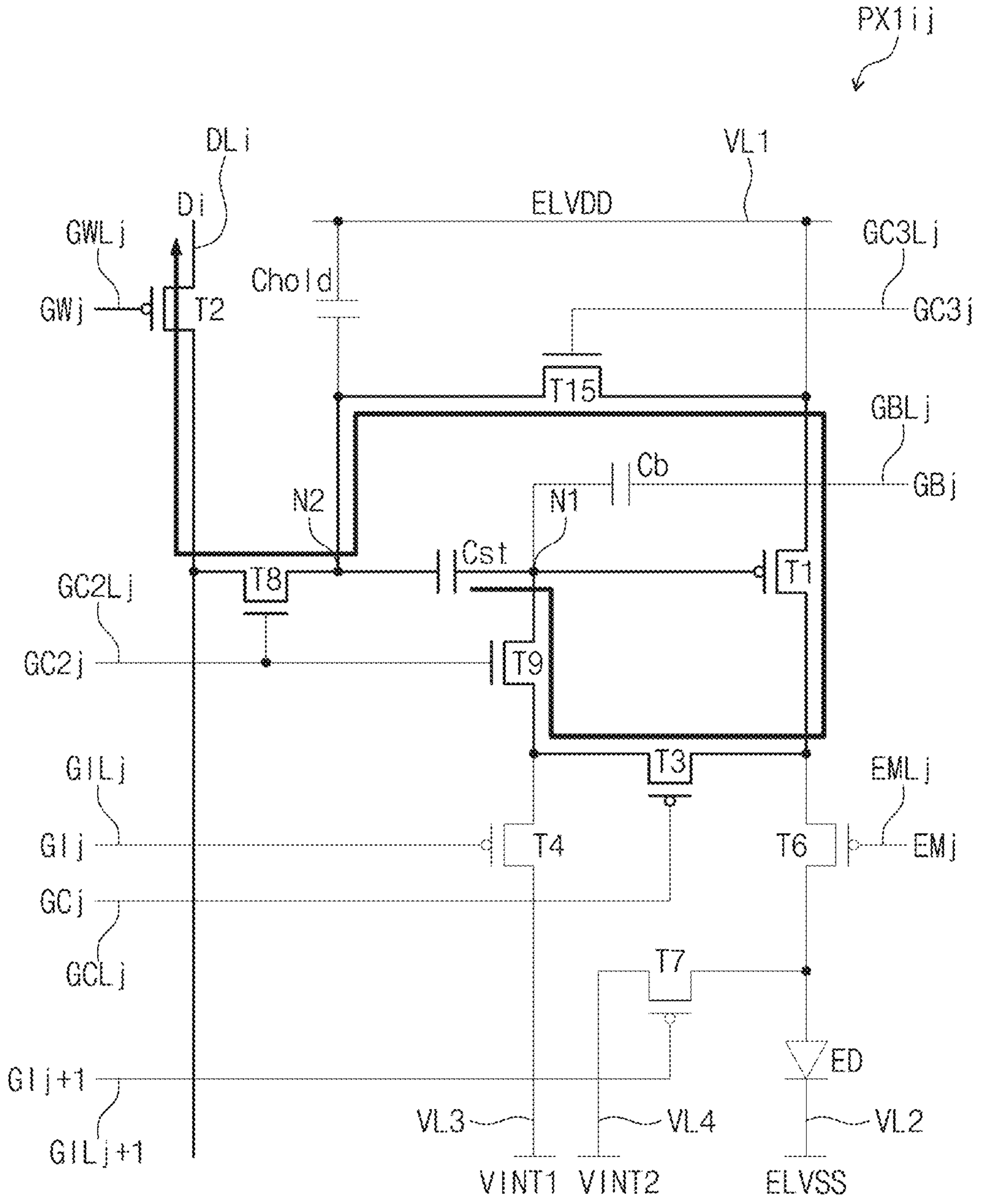
FIG. 10 is a diagram for describing an operation of a pixel in the nineteenth period shown in FIG. 9C.

FIG. 10 is a diagram for describing an operation of a pixel in the nineteenth period shown in FIG. 9C.

Referring to FIGS. 9C and 10, during the nineteenth period P19, the third transistor T3 is turned on when the scan signal GCj transitions to a low level, and the test transistor T15 is turned on when the scan signal GC3j transitions to a high level. Accordingly, a signal corresponding to the voltage level of the first node N1 may be provided to the second electrode of the second transistor T2 through the ninth transistor T9, the third transistor T3, the first transistor T1, the test transistor T15, and eighth transistor T8.

When the scan signal GWj transitions to a low level during the nineteenth period P19, the second transistor T2 may be turned on, and the signal of the second electrode of the second transistor T2 may be provided to a test device (not shown) through the data line DLi.

The test device may detect a voltage level received through the data line DLi. The test device may test the state of the pixel PX1ij by comparing a voltage level of the data signal Di provided to the data line DLi during the write frame WF with a voltage level of a signal received from the data line DLi during the read frame RF.

Figure 11:
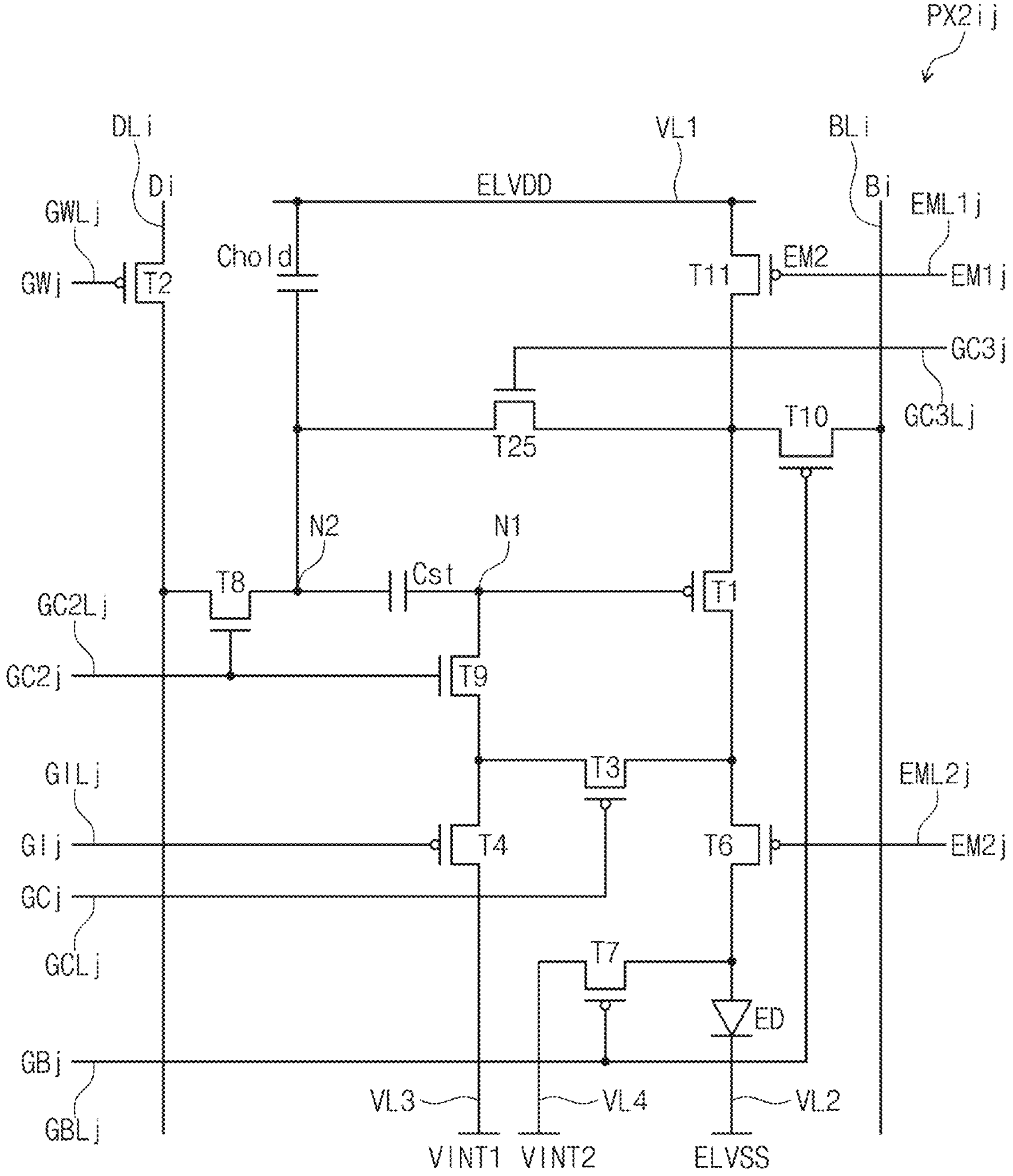
FIG. 11 is a circuit diagram of a pixel, according to an embodiment of the present disclosure.

FIG. 11 is a circuit diagram of a pixel, according to an embodiment of the present disclosure.

A pixel PX2ij illustrated in FIG. 11 includes a configuration similar to the pixel PXij shown in FIG. 2, and thus the same reference numerals are used for the same components, and additional descriptions are omitted to avoid redundancy.

Referring to FIG. 11, the pixel PX2ij includes a tenth transistor T10, an eleventh transistor T11, and a test transistor T25.

The tenth transistor T10 is connected between a bias line BLi and the first electrode of the first transistor T1. The gate electrode of the tenth transistor T10 is connected to the scan line GBLj.

The eleventh transistor T11 is connected between the first voltage line VL1 and the first electrode of the first transistor T1. The gate electrode of the eleventh transistor T11 is connected to a first emission control line EML1j.

The sixth transistor T6 is connected between the second electrode of the first transistor T1 and the light emitting element ED. The gate electrode of the sixth transistor T6 is connected to a second emission control line EML2j.

The test transistor T25 is connected between the second node N2 and the first electrode of the first transistor T1. The gate electrode of the test transistor T25 is connected to a scan line GC3Lj.

Figure 12A:
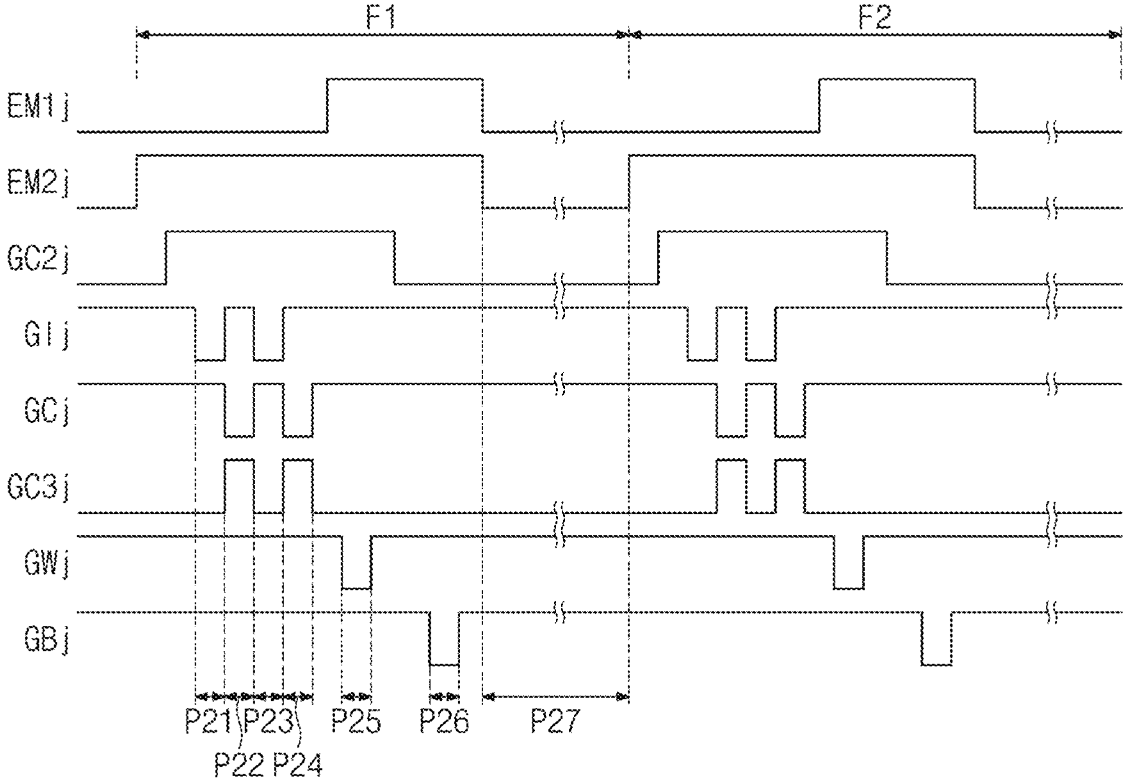
FIG. 12A is a timing diagram of scan signals and an emission control signal for describing an operation of the pixel shown in FIG. 11 when an operating frequency of a normal mode is a first operating frequency.

FIG. 12A is a timing diagram of scan signals and an emission control signal for describing an operation of the pixel shown in FIG. 11 when an operating frequency of a normal mode is a first operating frequency.

Figure 12B:
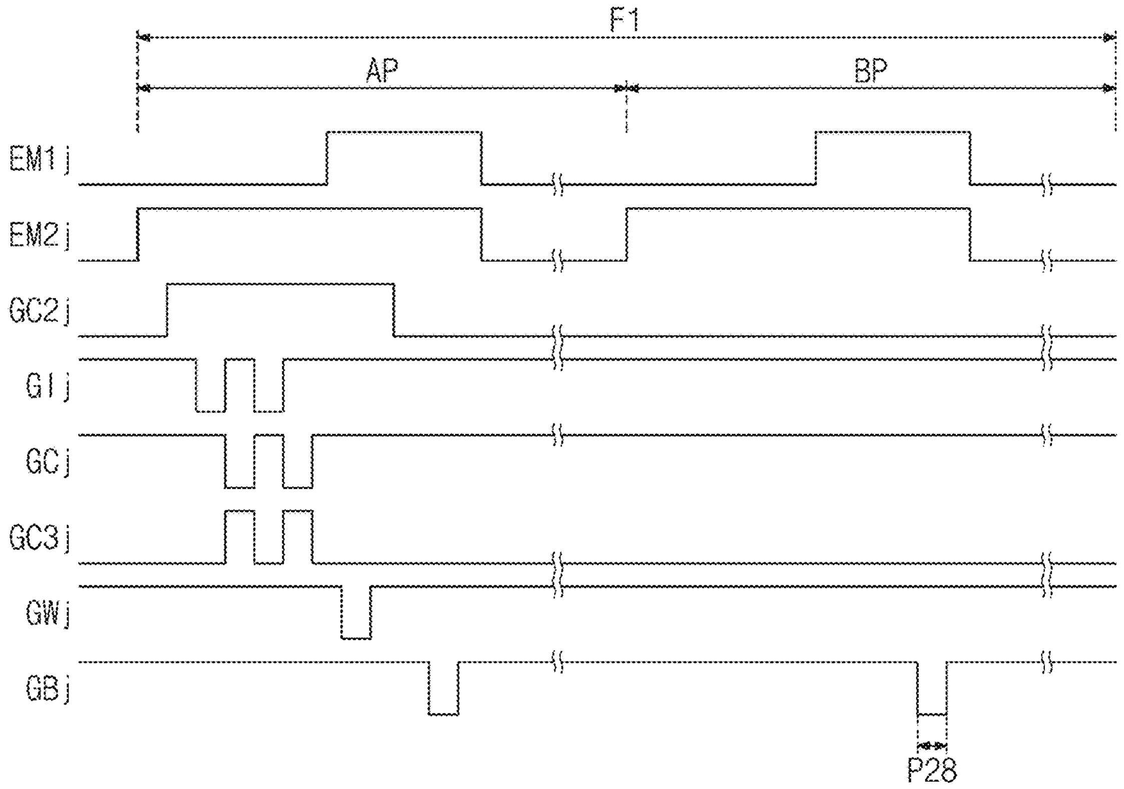
FIG. 12B is a timing diagram of scan signals and an emission control signal for describing an operation of the pixel shown in FIG. 11 when an operating frequency of a normal mode is a second operating frequency.

FIG. 12B is a timing diagram of scan signals and an emission control signal for describing an operation of the pixel shown in FIG. 11 when an operating frequency of a normal mode is a second operating frequency.

Figure 12C:
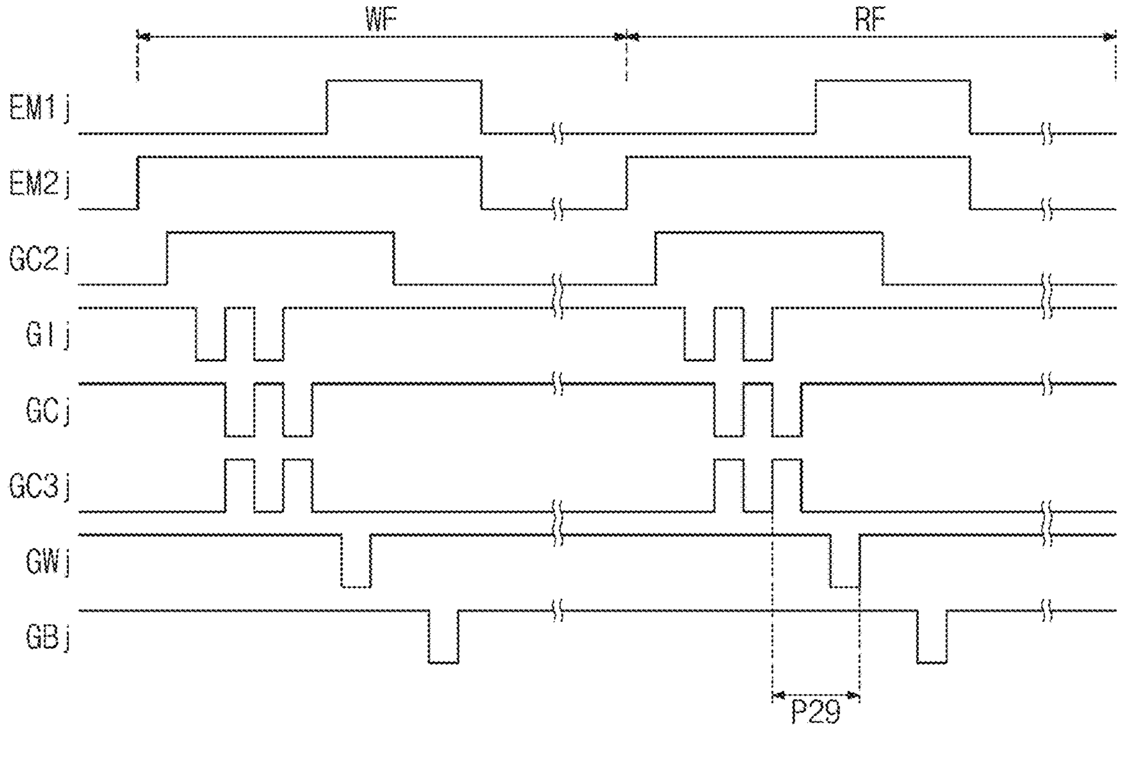
FIG. 12C is a timing diagram of scan signals and an emission control signal for describing an operation of the pixel shown in FIG. 11 in a test mode.

FIG. 12C is a timing diagram of scan signals and an emission control signal for describing an operation of the pixel shown in FIG. 11 in a test mode.

In FIGS. 12A to 12C, 21st to 29th periods P21 to P29 mean an operating state or operating period of the pixel PX2ij.

Referring to FIGS. 11 and 12A, each of the 21st period P21 and the 23rd period P23 of the first frame F1 may be an initialization period for initializing the gate electrode of the first transistor T1.

Each of the 22nd period P22 and the 24th period P24 may be a compensation period for compensating for the threshold voltage Vth of the first transistor T1.

When the scan signal GC3j transitions to a high level during each of the 22nd period P22 and the 24th period P24, the test transistor T25 is turned on. As the test transistor T25 is turned on, the second node N2 may be initialized to the first driving voltage ELVDD.

The 25th period P25 may be a write period for providing a voltage level corresponding to the data signal Di to the second end of the first capacitor Cst.

In the 26th period P26, the seventh transistor T7 is turned on in response to the scan signal GBj. When the seventh transistor T7 is turned on, the anode of the light emitting element ED may be electrically connected to the fourth voltage line VLA. The 26th period P26 may be an anode-initialization period for initializing the anode of the light emitting element ED to the second initialization voltage VINT2.

The 27th period P27 may be an emission period of the light emitting element ED.

Referring to FIGS. 11 and 12B, during the second operating frequency of the normal mode, the first frame F1 includes an active period AP and a blank period BP.

The pixel PX2ij may operate during the active period AP in the same manner as the pixel PX2ij during the first frame F1 shown in FIG. 12A.

The pixel PX2ij does not receive the valid data signal Di during the blank period BP. That is, during the blank period BP, each of the scan signals GC2j, GIj, GCj, GWj, and GC3j is maintained at an inactive level.

When the scan signal GBj transitions to a low level during the 28th period P28, the tenth transistor T10 may be turned on and a bias signal Bi provided through the bias line BLi may be provided to the first electrode of the first transistor T1. The bias signal Bi may be set to a voltage level at which the first transistor T1 is initialized. Accordingly, it is possible to minimize a change in luminance of the light emitting element ED due to a hysteresis characteristic of the first transistor T1.

The 28th period P28 may be a bias period for providing a bias voltage to the first electrode of the first transistor T1.

Referring to FIGS. 11 and 12C, in a test mode, the pixel PX2*ij* may operate during a write frame WF and a read frame RF.

The pixel PX2*ij* may operate during the write frame WF in the same manner as the pixel PX2*ij* during the first frame F1 in the normal mode shown in FIG. 12A.

Similarly to the first frame F1 of the normal mode shown in FIG. 12A, the pixel PX2*ij* may operate during the read frame RF. However, during the read frame RF, the valid data signal Di may not be provided through the data line DLi, and a signal corresponding to the voltage level of the first node N1 may be provided to the data line DLi.

Figure 13:
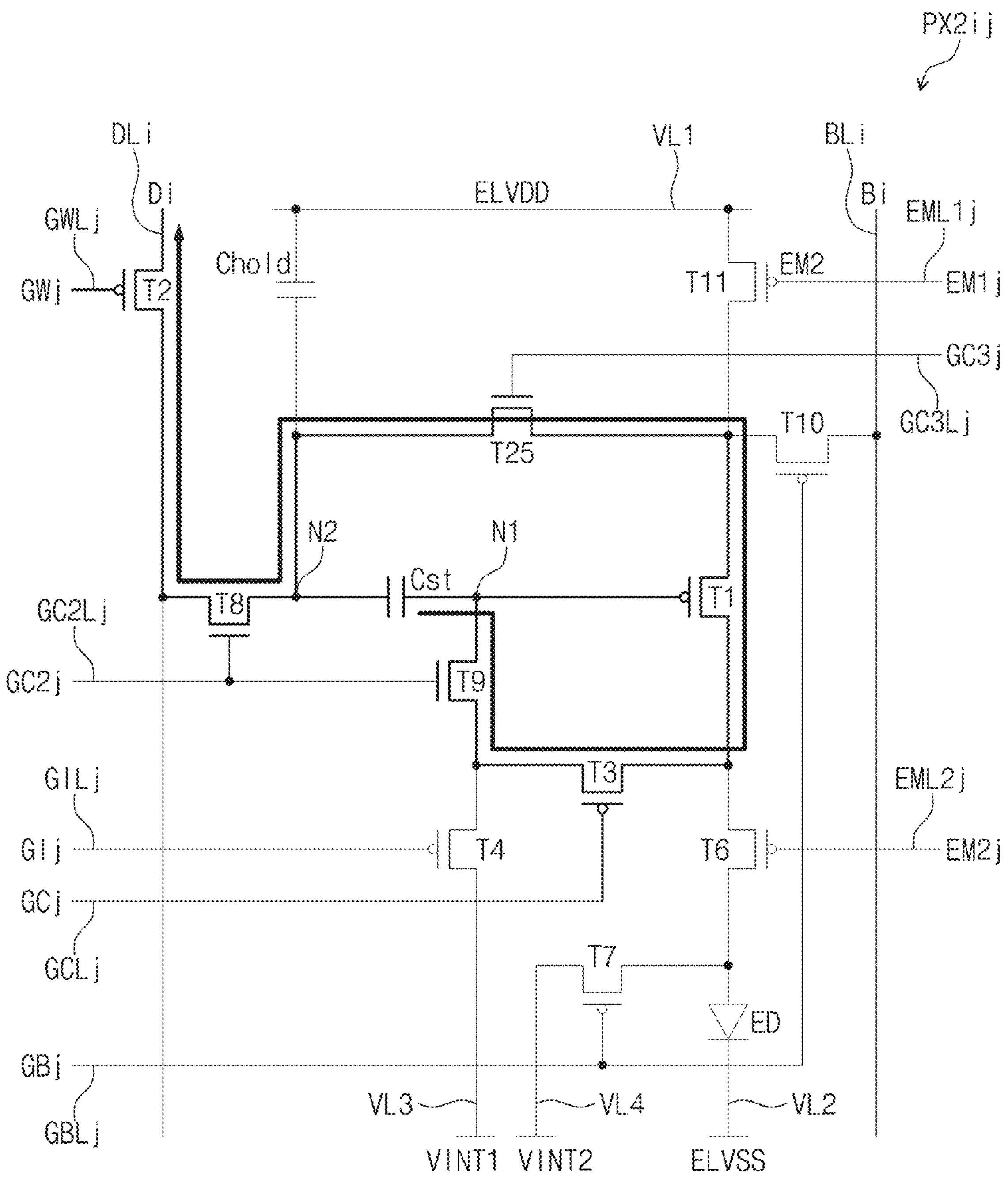
FIG. 13 is a diagram for describing an operation of a pixel in the 29th period shown in FIG. 12C.

FIG. 13 is a diagram for describing an operation of a pixel in the 29th period shown in FIG. 12C.

Referring to FIGS. 12C and 13, during the 29th period P29, the third transistor T3 is turned on when the scan signal GCj transitions to a low level, and the test transistor T25 is turned on when the scan signal GC3*j* transitions to a high level. Accordingly, a signal corresponding to the voltage level of the first node N1 may be provided to the second electrode of the second transistor T2 through the ninth transistor T9, the third transistor T3, the first transistor T1, the test transistor T25, and the eighth transistor T8.

When the scan signal GWj transitions to a low level during the 29th period P29, the second transistor T2 may be turned on, and the signal of the second electrode of the second transistor T2 may be provided to a test device (not shown) through the data line DLi.

The test device may detect a voltage level received through the data line DLi. The test device may test the state of the pixel PX2*ij* by comparing a voltage level of the data signal Di provided to the data line DLi during the write frame WF with a voltage level of a signal received from the data line DLi during the read frame RF.

Figure 14:
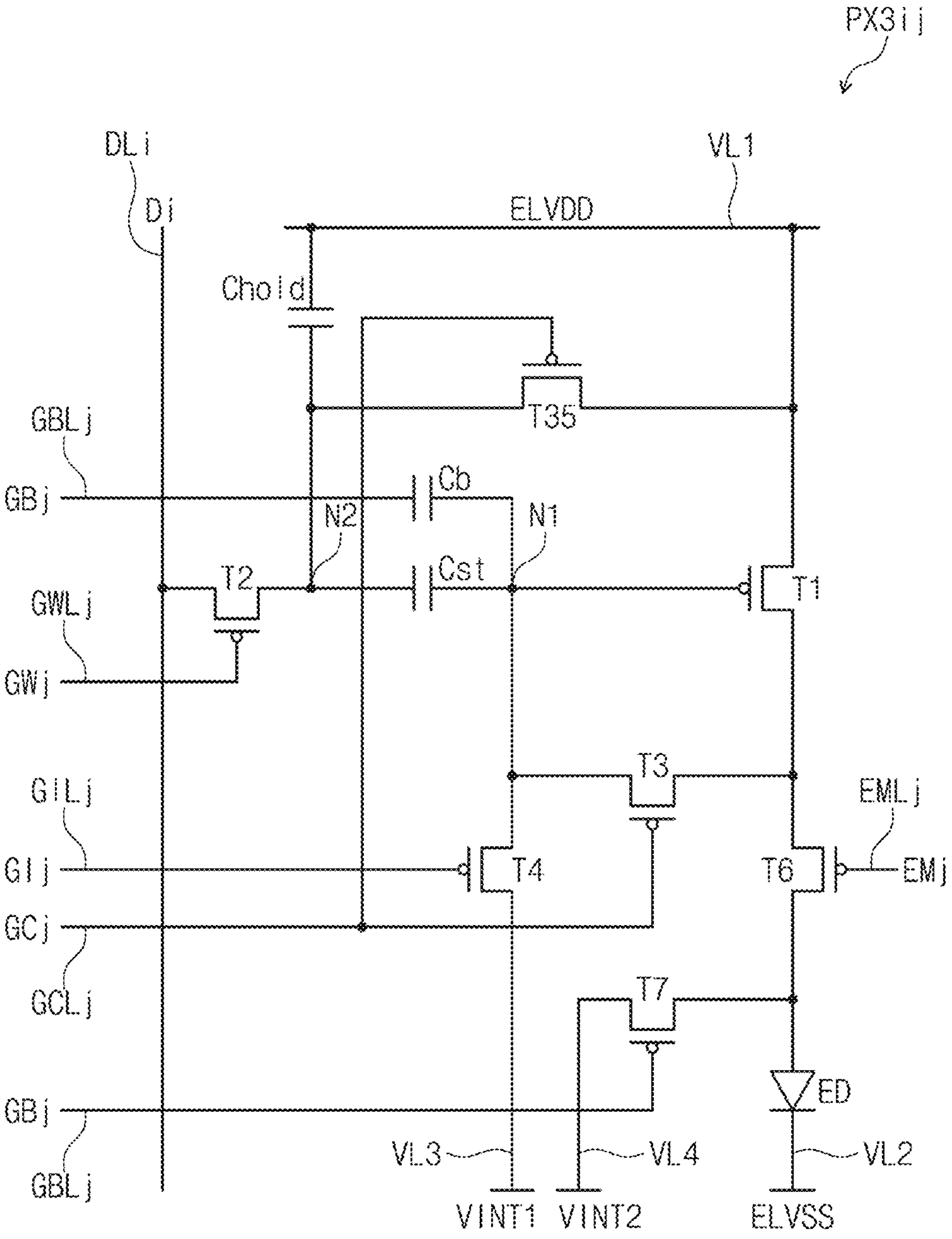
FIG. 14 is a circuit diagram of a pixel, according to an embodiment of the present disclosure.

FIG. 14 is a circuit diagram of a pixel, according to an embodiment of the present disclosure.

A pixel PX3*ij* illustrated in FIG. 14 includes a configuration similar to the pixel PXij shown in FIG. 2, and thus the same reference numerals are used for the same components, and additional descriptions are omitted to avoid redundancy.

Referring to FIG. 14, the pixel PX3*ij* includes first to fourth transistors T1 to T4, the sixth transistor T6, the seventh transistor T7, a test transistor T35, and first to third capacitors Cst, Chold, and Cb.

The pixel PXij shown in FIG. 2 includes the eighth transistor T8 and the ninth transistor T9, but the pixel PX3*ij* shown in FIG. 14 does not include the eighth transistor T8 and the ninth transistor T9.

The test transistor T35 is connected between the second node N2 and the first electrode of the first transistor T1. The gate electrode of the test transistor T35 is connected to the scan line GCLj.

Figure 15A:
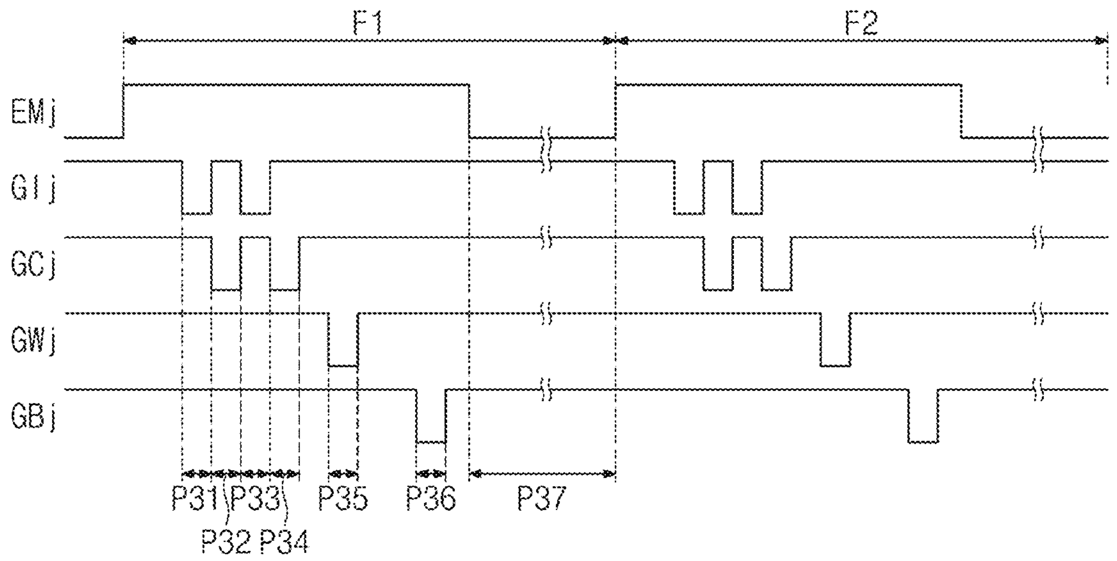
FIG. 15A is a timing diagram of scan signals and an emission control signal for describing an operation of the pixel shown in FIG. 14 when an operating frequency of a normal mode is a first operating frequency.

FIG. 15A is a timing diagram of scan signals and an emission control signal for describing an operation of the pixel shown in FIG. 14 when an operating frequency of a normal mode is a first operating frequency.

Figure 15B:
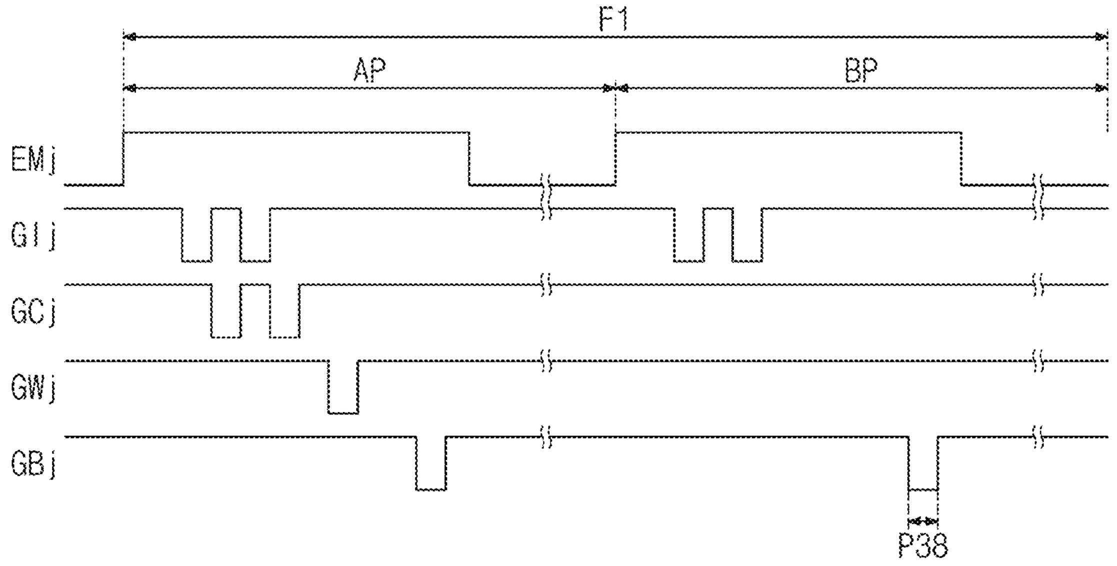
FIG. 15B is a timing diagram of scan signals and an emission control signal for describing an operation of the pixel shown in FIG. 14 when an operating frequency of a normal mode is a second operating frequency.

FIG. 15B is a timing diagram of scan signals and an emission control signal for describing an operation of the pixel shown in FIG. 14 when an operating frequency of a normal mode is a second operating frequency.

Figure 15C:
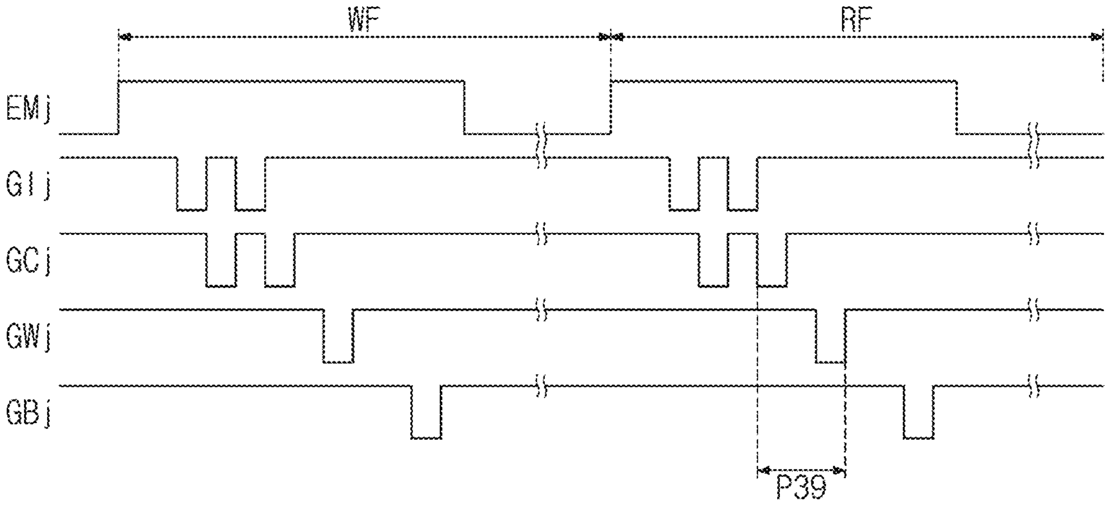
FIG. 15C is a timing diagram of scan signals and an emission control signal for describing an operation of the pixel shown in FIG. 14 in a test mode.

FIG. 15C is a timing diagram of scan signals and an emission control signal for describing an operation of the pixel shown in FIG. 14 in a test mode.

In FIGS. 15A to 15C, each of 31st to 39th periods P31 to P39 mean an operating state or operating period of the pixel PX3*ij*.

Referring to FIGS. 14 and 15A, each of the 31st period P31 and the 33rd period P33 of the first frame F1 may be an initialization period for initializing the gate electrode of the first transistor T1.

Each of the 32nd period P32 and the 34th period P34 may be a compensation period for compensating for the threshold voltage Vth of the first transistor T1.

When the scan signal GCj transitions to a low level during each of the 32nd period P32 and the 34th period P34, the test transistor T35 is turned on. As the test transistor T35 is turned on, the second node N2 may be initialized to the first driving voltage ELVDD. When the scan signal GCj transitions to a low level, the third transistor T3 is turned on. Accordingly, a voltage (ELVDD-Vth) obtained by subtracting a threshold voltage Vth of the first transistor T1 from the first driving voltage ELVDD may be provided to the first end of the first capacitor Cst through the third transistor T3. Each of the 32nd period P32 and the 34th period P34 may be a compensation period for compensating for the threshold voltage Vth of the first transistor T1.

The 35th period P35 may be a write period for providing a voltage level corresponding to the data signal Di to the second end of the first capacitor Cst.

In the 36th period P36, the seventh transistor T7 is turned on in response to the scan signal GBj. When the seventh transistor T7 is turned on, the anode of the light emitting element ED may be electrically connected to the fourth voltage line VL4. The 36th period P36 may be an initialization period for initializing the anode of the light emitting element ED to the second initialization voltage VINT2.

The 37th period P37 may be an emission period of the light emitting element ED.

Referring to FIGS. 14 and 15B, during the second operating frequency of the normal mode, the first frame F1 includes an active period AP and a blank period BP.

The pixel PX3*ij* may operate during the active period AP in the same manner as the pixel PX3*ij* during the first frame F1 shown in FIG. 15A.

The pixel PX3*ij* does not receive the valid data signal Di during the blank period BP. That is, during the blank period BP, each of the scan signals GCj, and GWj is maintained at an inactive level.

When the scan signal GBj transitions to a low level during the 38th period P38, the seventh transistor T7 is turned on. As the seventh transistor T7 is turned on, the anode of the light emitting element ED may be initialized to the second initialization voltage VINT2.

Referring to FIGS. 14 and 15C, in a test mode, the pixel PX3*ij* may operate during a write frame WF and a read frame RF.

The pixel PX3*ij* may operate during the write frame WF in the same manner as the pixel PX3*ij* during the first frame F1 in the normal mode shown in FIG. 15A.

Similarly to the first frame F1 of the normal mode shown in FIG. 15A, the pixel PX3*ij* may operate during the read frame RF. However, during the read frame RF, the valid data signal Di may not be provided through the data line DLi, and a signal corresponding to the voltage level of the first node N1 may be provided to the data line DLi.

Figure 16:
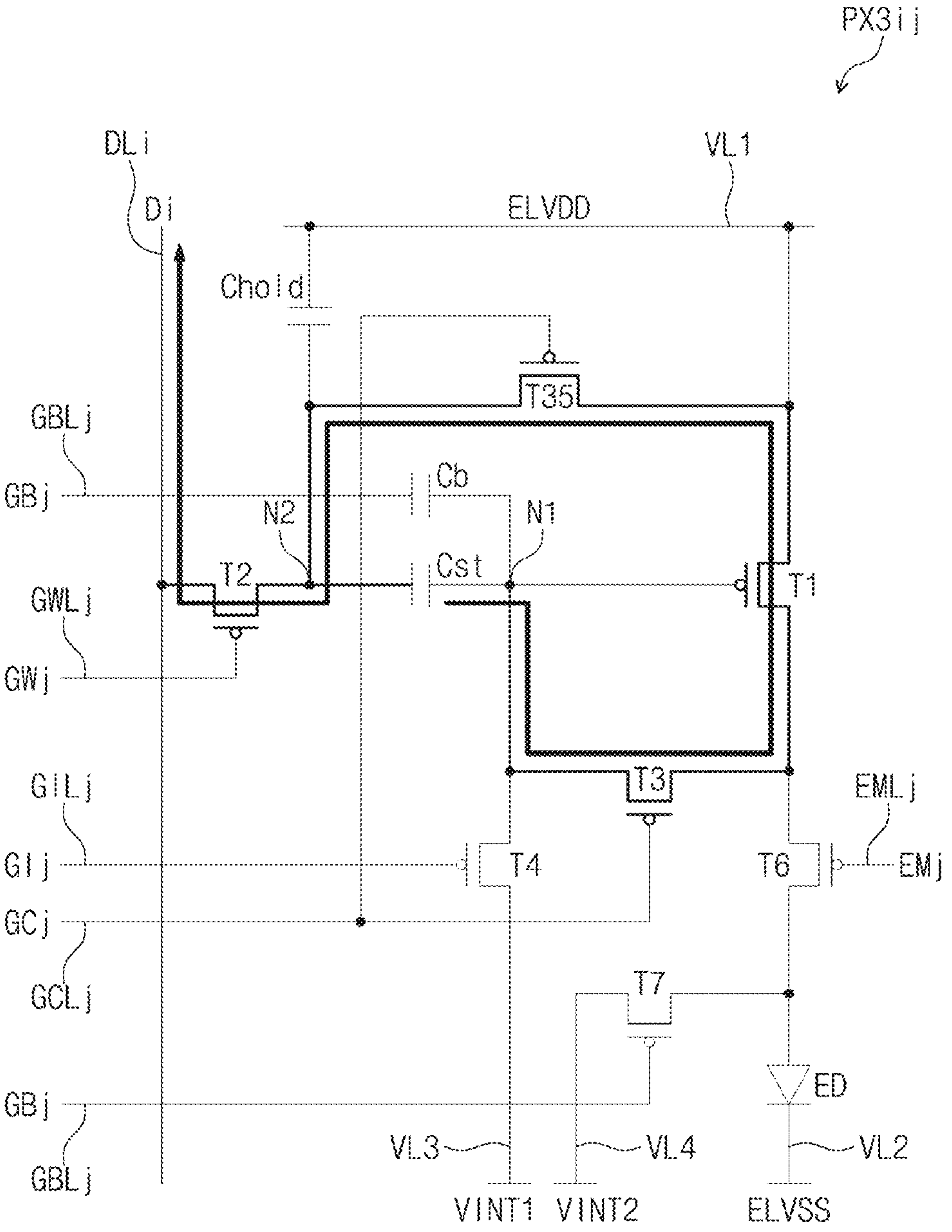
FIG. 16 is a diagram for describing an operation of a pixel in the 39th period shown in FIG. 15C.

FIG. 16 is a diagram for describing an operation of a pixel in the 39th period shown in FIG. 15C.

Referring to FIGS. 15C and 16, when the scan signal GCj transitions to a low level during the 39th period P39, the third transistor T3 and the test transistor T35 are turned on. Accordingly, a signal corresponding to the voltage level of the first node N1 may be provided to the second electrode of the second transistor T2 through the third transistor T3, the first transistor T1, and the test transistor T35.

When the scan signal GWj transitions to a low level during the 39th period P39, the second transistor T2 may be turned on, and the signal of the second electrode of the second transistor T2 may be provided to a test device (not shown) through the data line DLi.

The test device may detect a voltage level received through the data line DLi. The test device may test a state of the pixel PX3*ij* by comparing a voltage level of the data signal Di provided to the data line DLi during the write frame WF with a voltage level of a signal received from the data line DLi during the read frame RF.

Figure 17:
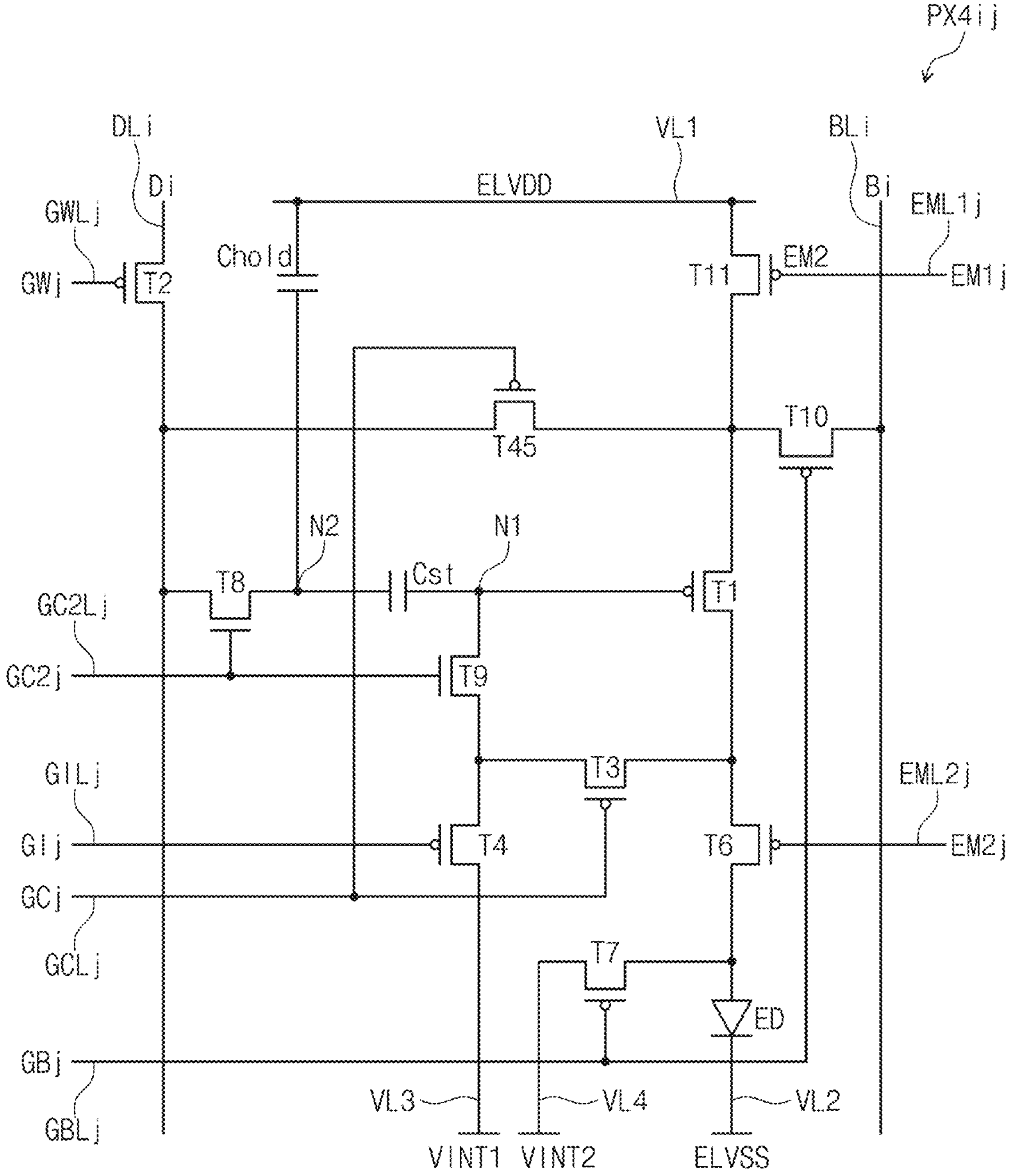
FIG. 17 is a circuit diagram of a pixel, according to an embodiment of the present disclosure.

FIG. 17 is a circuit diagram of a pixel, according to an embodiment of the present disclosure.

A pixel PX4*ij* illustrated in FIG. 17 includes a configuration similar to the pixel PX2*ij* shown in FIG. 11, and thus the same reference numerals are used for the same components, and additional descriptions are omitted to avoid redundancy.

Referring to FIG. 17, a test transistor T45 of the pixel PX4*ij* is connected between the first electrode of the first transistor T1 and the second electrode of the second transistor T2. The gate electrode of the test transistor T45 is connected to the scan line GCLj.

Figure 18A:
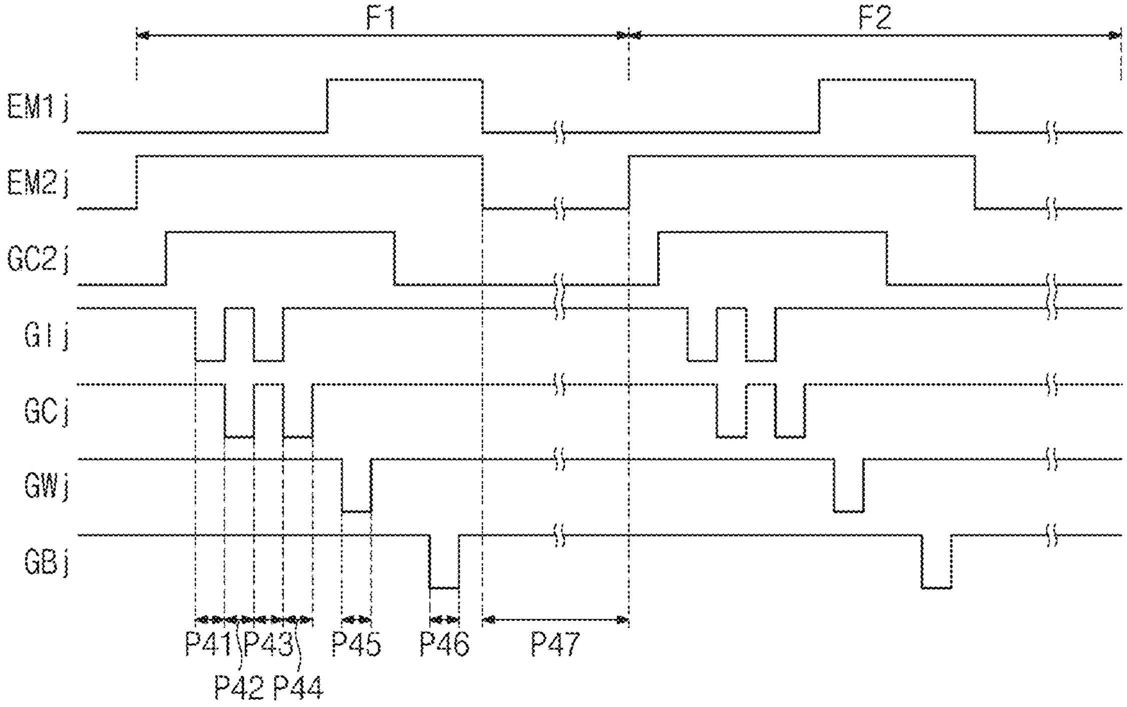
FIG. 18A is a timing diagram of scan signals and an emission control signal for describing an operation of the pixel shown in FIG. 17 when an operating frequency of a normal mode is a first operating frequency.

FIG. 18A is a timing diagram of scan signals and an emission control signal for describing an operation of the pixel shown in FIG. 17 when an operating frequency of a normal mode is a first operating frequency.

Figure 18B:
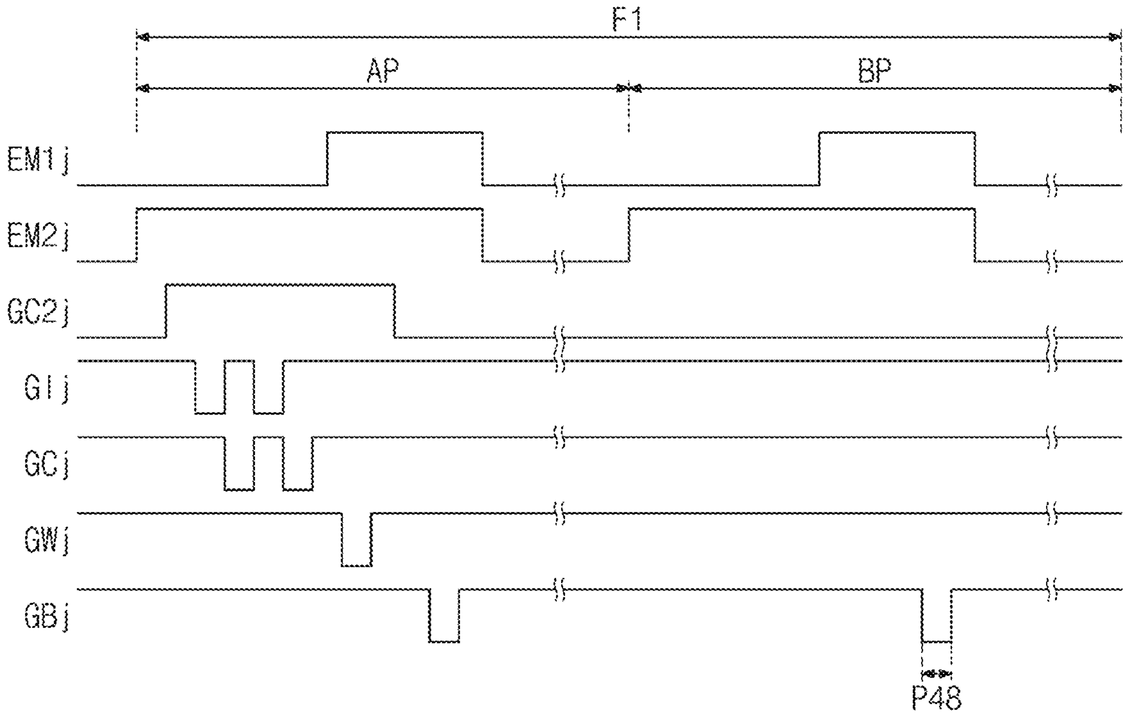
FIG. 18B is a timing diagram of scan signals and an emission control signal for describing an operation of the pixel shown in FIG. 17 when an operating frequency of a normal mode is a second operating frequency.

FIG. 18B is a timing diagram of scan signals and an emission control signal for describing an operation of the pixel shown in FIG. 17 when an operating frequency of a normal mode is a second operating frequency.

Figure 18C:
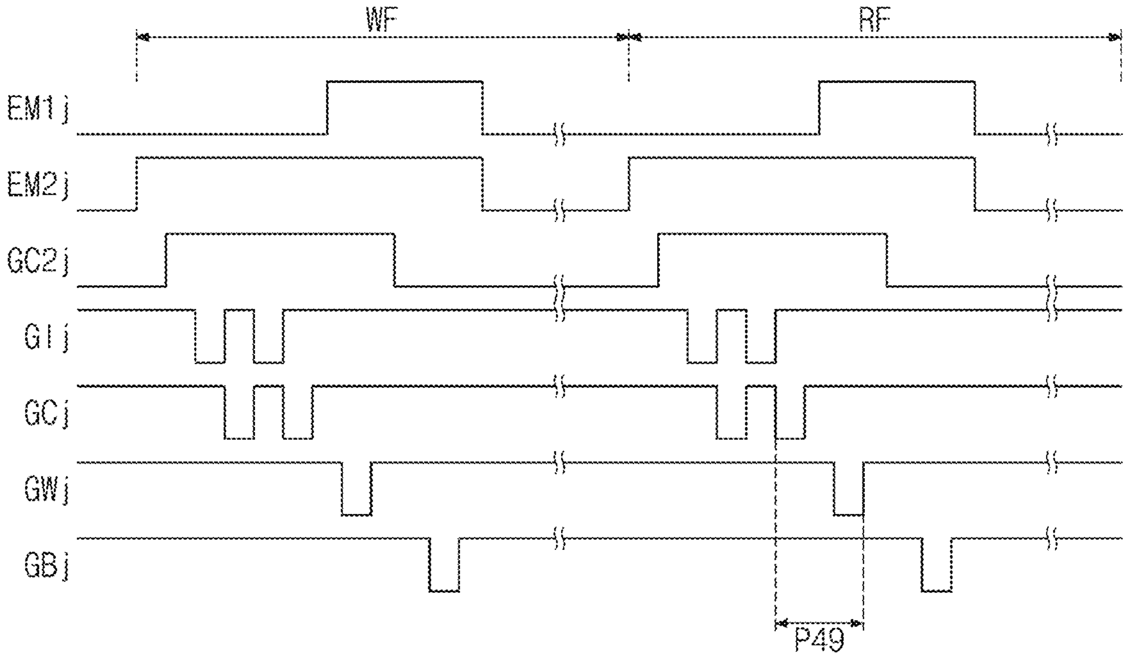
FIG. 18C is a timing diagram of scan signals and an emission control signal for describing an operation of the pixel shown in FIG. 17 in a test mode.

FIG. 18C is a timing diagram of scan signals and an emission control signal for describing an operation of the pixel shown in FIG. 17 in a test mode.

Referring to FIGS. 17 and 18A, each of a 41st period P41 and a 43rd period P43 of the first frame F1 may be an initialization period for initializing the gate electrode of the first transistor T1.

Each of a 42nd period P42 and a 44th period P44 may be a compensation period for compensating for the threshold voltage Vth of the first transistor T1.

When the scan signal GCj transitions to a low level during each of the 42nd period P42 and the 44th period P44, the test transistor T45 is turned on. As the test transistor T45 is turned on, the first electrode of the first transistor T1 may be electrically connected to the second electrode of the second transistor T2. When the scan signal GCj transitions to a low level, the third transistor T3 is turned on.

A 45th period P45 may be a write period for providing a voltage level corresponding to the data signal Di to the second end of the first capacitor Cst.

In a 46th period P46, the seventh transistor T7 is turned on in response to the scan signal GBj. Accordingly, the anode of the light emitting element ED may be electrically connected to the fourth voltage line VL4. The 46th period P46 may be an anode-initialization period for initializing the anode of the light emitting element ED to the second initialization voltage VINT2.

A 47th period P47 may be an emission period of the light emitting element ED.

Referring to FIGS. 17 and 18B, during the second operating frequency of the normal mode, the first frame F1 includes an active period AP and a blank period BP.

The pixel PX4*ij* may operate during the active period AP in the same manner as the pixel PX4*ij* during the first frame F1 shown in FIG. 18A.

The pixel PX4*ij* does not receive the valid data signal Di during the blank period BP. That is, during the blank period BP, each of the scan signals GC2*j*, GIj, GCj, and GWj is maintained at an inactive level.

When the scan signal GBj transitions to a low level during a 48th period P48, the tenth transistor T10 may be turned on and the bias signal Bi provided through the bias line BLi may be provided to the first electrode of the first transistor T1. The bias signal Bi may be set to a voltage level at which the first transistor T1 is initialized. Accordingly, it is possible to minimize a change in luminance of the light emitting element ED due to a hysteresis characteristic of the first transistor T1.

Moreover, when the scan signal GBj transitions to a low level in the 48th period P48, the seventh transistor T7 is turned on such that the anode of the light emitting element ED is capable of being initialized to the second initialization voltage VINT2.

Referring to FIGS. 17 and 18C, in a test mode, the pixel PX4*ij* may operate during a write frame WF and a read frame RF.

The pixel PX4*ij* may operate during the write frame WF in the same manner as the pixel PX4*ij* during the first frame F1 in the normal mode shown in FIG. 18A.

Similarly to the first frame F1 of the normal mode shown in FIG. 18A, the pixel PX4*ij* may operate during the read frame RF. However, the valid data signal Di is not provided through the data line DLi during the read frame RF.

When the scan signal GCj transitions to a low level during a 49th period P49, the third transistor T3 and the test transistor T45 are turned on. Accordingly, a signal corresponding to the voltage level of the first node N1 may be provided to the second electrode of the second transistor T2 through the ninth transistor T9, the third transistor T3, the first transistor T1, and the test transistor T45.

When the scan signal GWj transitions to a low level during the 49th period P49, the second transistor T2 may be turned on, and the signal of the second electrode of the second transistor T2 may be provided to a test device (not shown) through the data line DLi.

The test device may detect a voltage level received through the data line DLi. The test device may test the state of the pixel PX4*ij* by comparing a voltage level of the data signal Di provided to the data line DLi during the write frame WF with a voltage level of a signal received from the data line DLi during the read frame RF.

Figure 19:
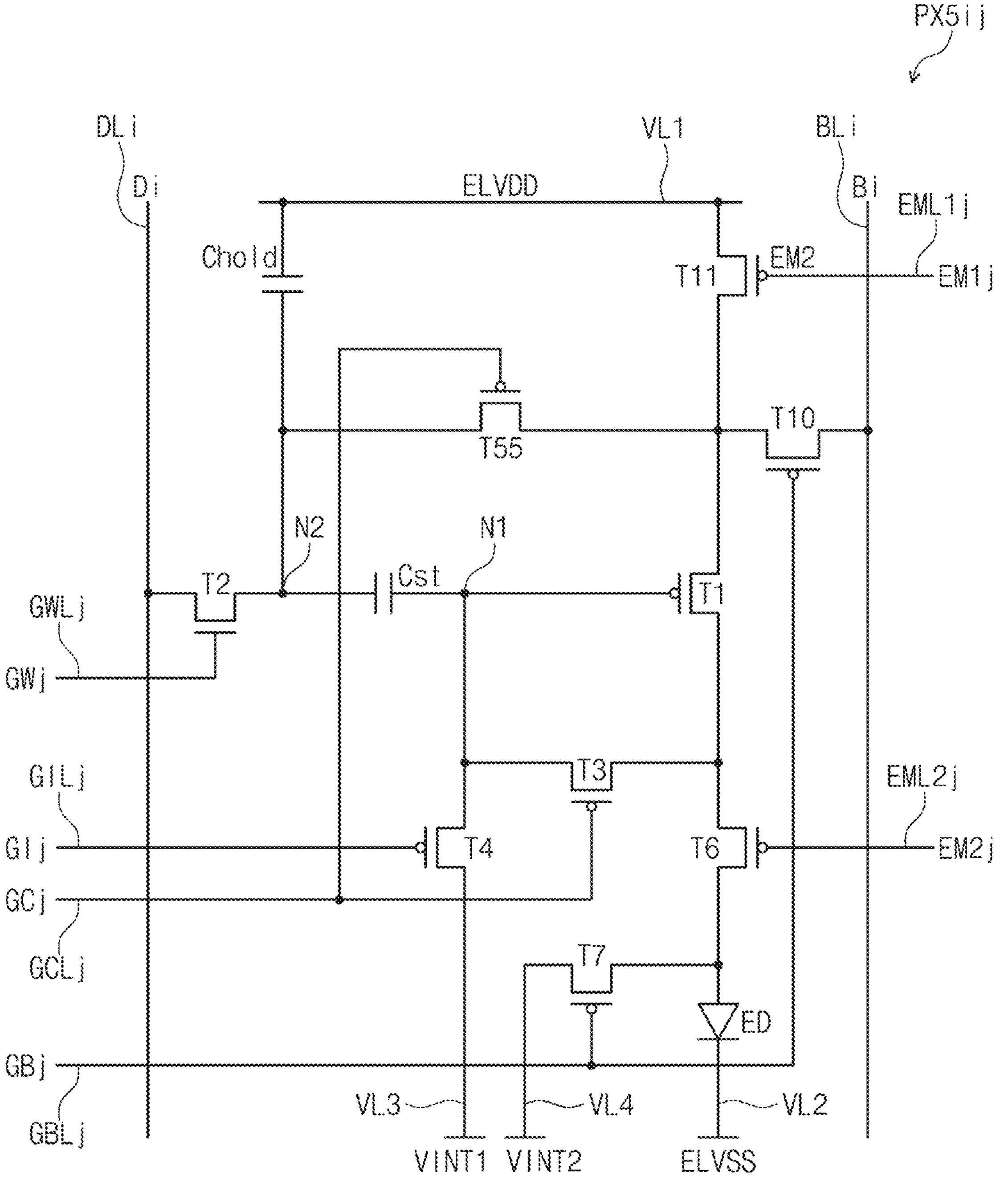
FIG. 19 is a circuit diagram of a pixel, according to an embodiment of the present disclosure.

FIG. 19 is a circuit diagram of a pixel, according to an embodiment of the present disclosure.

A pixel PX5*ij* illustrated in FIG. 19 includes a configuration similar to the pixel PX2*ij* shown in FIG. 11, and thus the same reference numerals are used for the same components, and additional descriptions are omitted to avoid redundancy.

Referring to FIG. 19, a test transistor T55 of the pixel PX5*ij* is connected between the first electrode of the first transistor T1 and the second node N2. The gate electrode of the test transistor T55 is connected to the scan line GCLj.

The pixel PX2*ij* shown in FIG. 11 includes the eighth transistor T8 and the ninth transistor T9, but the pixel PX5*ij* shown in FIG. 19 does not include the eighth transistor T8 and the ninth transistor T9. The second transistor T2 is connected between the data line DLi and the second node N2. The third transistor T3 is connected between the second electrode of the first transistor T1 and the first node N1. The fourth transistor T4 is connected between the first node N1 and the third voltage line VL3 through which the first initialization voltage VINT1 is supplied.

Figure 20A:
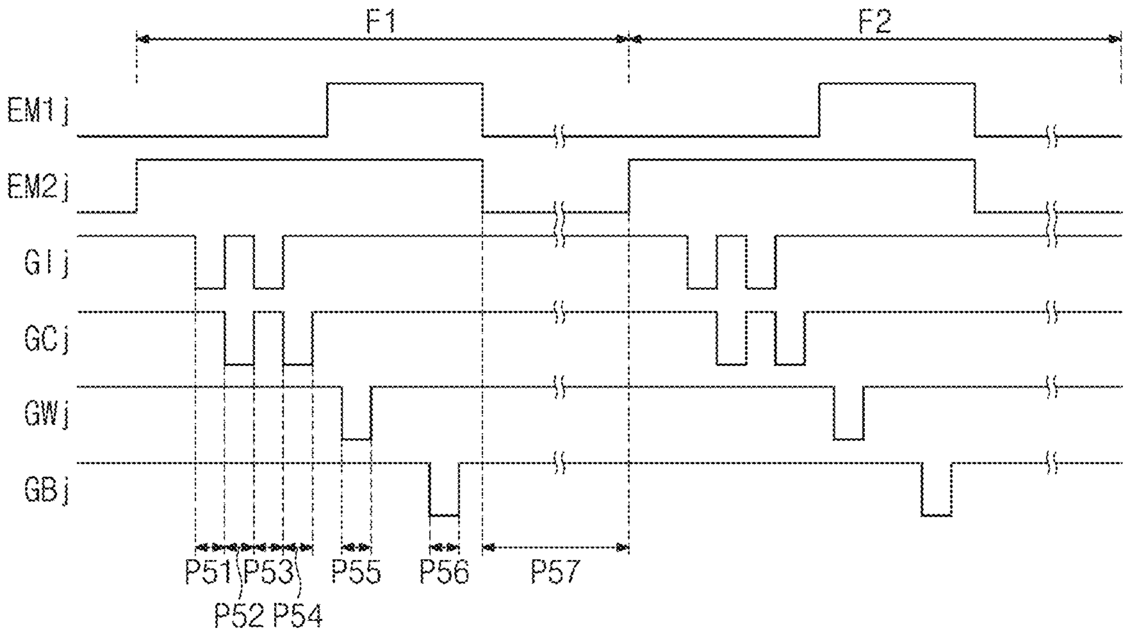
FIG. 20A is a timing diagram of scan signals and an emission control signal for describing an operation of the pixel shown in FIG. 19 when an operating frequency of a normal mode is a first operating frequency.

FIG. 20A is a timing diagram of scan signals and an emission control signal for describing an operation of the pixel shown in FIG. 19 when an operating frequency of a normal mode is a first operating frequency.

Figure 20B:
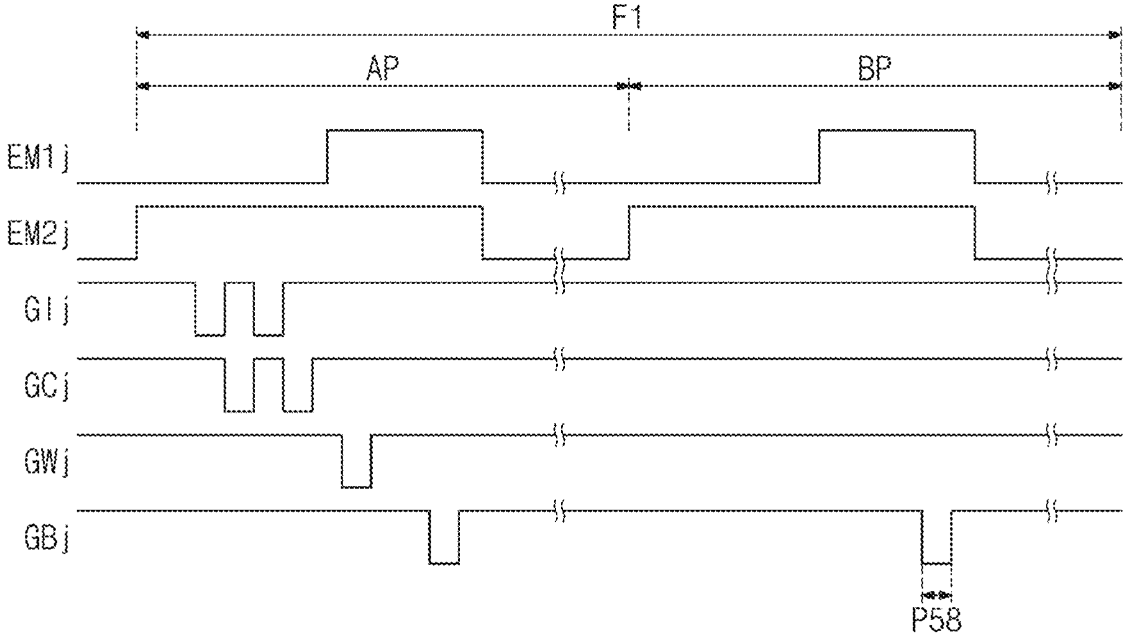
FIG. 20B is a timing diagram of scan signals and an emission control signal for describing an operation of the pixel shown in FIG. 19 when an operating frequency of a normal mode is a second operating frequency.

FIG. 20B is a timing diagram of scan signals and an emission control signal for describing an operation of the pixel shown in FIG. 19 when an operating frequency of a normal mode is a second operating frequency.

Figure 20C:
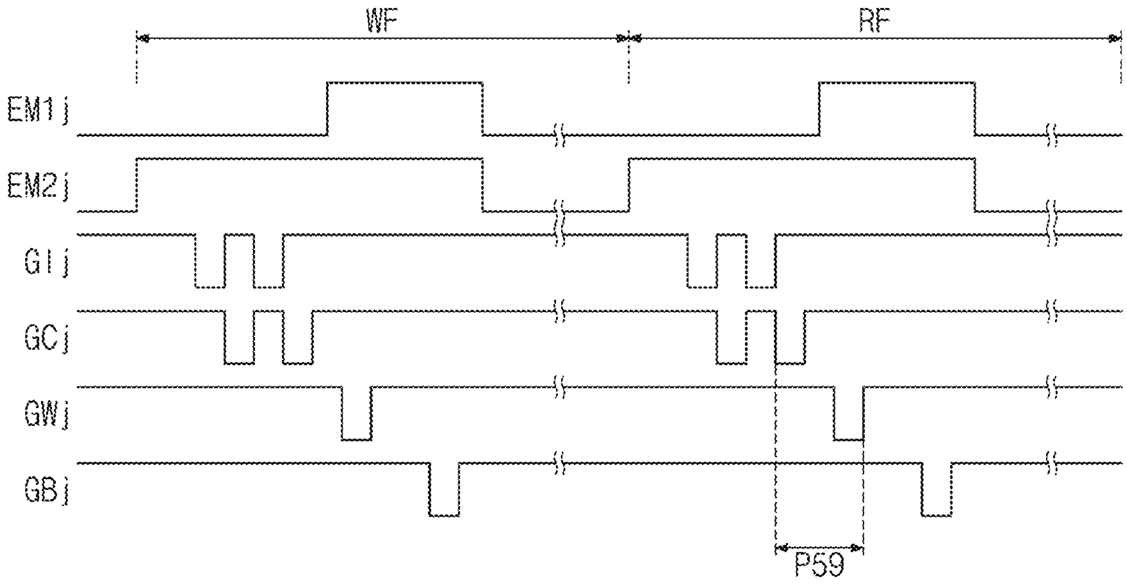
FIG. 20C is a timing diagram of scan signals and an emission control signal for describing an operation of the pixel shown in FIG. 19 in a test mode.

FIG. 20C is a timing diagram of scan signals and an emission control signal for describing an operation of the pixel shown in FIG. 19 in a test mode.

Referring to FIGS. 19 and 20A, each of a 51st period P51 and a 53rd period P53 of the first frame F1 may be an initialization period for initializing the gate electrode of the first transistor T1.

Each of a 52nd period P52 and a 54th period P54 may be a compensation period for compensating for the threshold voltage Vth of the first transistor T1.

When the scan signal GCj transitions to a low level during each of the 52nd period P52 and the 54th period P54, the test transistor T55 is turned on. As the test transistor T55 is turned on, the first electrode of the first transistor T1 may be electrically connected to the second node N2.

A 55th period P55 may be a write period for providing a voltage level corresponding to the data signal Di to the second end of the first capacitor Cst.

In a 56th period P56, the seventh transistor T7 is turned on in response to the scan signal GBj. As the seventh transistor T7 is turned on, the anode of the light emitting element ED is electrically connected to the fourth voltage line VLA. The 56th period P56 may be an anode-initialization period for initializing the anode of the light emitting element ED to the second initialization voltage VINT2.

A 57th period P57 may be an emission period of the light emitting element ED.

Referring to FIGS. 19 and 20B, during the second operating frequency of the normal mode, the first frame F1 includes an active period AP and a blank period BP.

The pixel PX5*ij* may operate during the active period AP in the same manner as the pixel PX5*ij* during the first frame F1 shown in FIG. 20A.

The pixel PX5*ij* does not receive the valid data signal Di during the blank period BP. That is, during the blank period BP, each of the scan signals GIj, GCj, and GWj is maintained at an inactive level.

When the scan signal GBj transitions to a low level during a 58th period P58, the tenth transistor T10 may be turned on and the bias signal Bi provided through the bias line BLi may be provided to the first electrode of the first transistor T1. The bias signal Bi may be set to a voltage level at which the first transistor T1 is initialized. Accordingly, it is possible to minimize a change in luminance of the light emitting element ED due to a hysteresis characteristic of the first transistor T1.

Moreover, when the scan signal GBj transitions to a low level in the 58th period P58, the seventh transistor T7 is turned on such that the anode of the light emitting element ED is capable of being initialized to the second initialization voltage VINT2.

Referring to FIGS. 19 and 20C, in a test mode, the pixel PX5*ij* may operate during a write frame WF and a read frame RF.

The pixel PX5*ij* may operate during the write frame WF in the same manner as the pixel PX5*ij* during the first frame F1 in the normal mode shown in FIG. 20A.

Similarly to the first frame F1 of the normal mode shown in FIG. 20A, the pixel PX5*ij* may operate during the read frame RF. However, the valid data signal Di is not provided through the data line DLi during the read frame RF.

When the scan signal GCj transitions to a low level during a 59th period P59, the third transistor T3 and the test transistor T55 are turned on. Accordingly, a signal corresponding to the voltage level of the first node N1 may be provided to the second node N2 through the third transistor T3, the first transistor T1, and the test transistor T55.

When the scan signal GWj transitions to a low level during the 59th period P59, the second transistor T2 may be turned on, and the signal of the second node N2 may be provided to a test device (not shown) through the data line DLi.

The test device may detect a voltage level received through the data line DLi. The test device may test the state of the pixel PX5*ij* by comparing a voltage level of the data signal Di provided to the data line DLi during the write frame WF with a voltage level of a signal received from the data line DLi during the read frame RF.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

A pixel having such a configuration may output internal state information to the outside through a data line in a test mode. Accordingly, it is easy to detect defects in a production stage, thereby improving production efficiency.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A pixel comprising:
- a light emitting element;
- a first transistor comprising a first electrode electrically connected to a first voltage line, a second electrode electrically connected to the light emitting element, and a gate electrode connected to a first node;
- a second transistor comprising a first electrode connected to a data line, a second electrode, and a gate electrode connected to a first scan line;
- a third transistor comprising a first electrode, a second electrode connected to the second electrode of the first transistor, and a gate electrode connected to a second scan line; and
- a test transistor comprising a first electrode connected to the first electrode of the first transistor, a second electrode electrically connected to the second electrode of the second transistor, and a gate electrode connected to a third scan line;
- a first capacitor connected between the first voltage line and a second node;

a second capacitor connected between the first node and the second node;

a eighth transistor connected between the second node and the second electrode of the second transistor and comprising a gate electrode connected to a fourth scan line;

a nineth transistor connected between the first node and the first electrode of the third transistor and comprising a gate electrode connected to the fourth scan line; and a tenth transistor connected between the first electrode of the first transistor and a bias line, and comprising a gate electrode connected to a fifth scan line.

2. A pixel comprising:

a light emitting element;

a first transistor comprising a first electrode electrically connected to a first voltage line, a second electrode electrically connected to the light emitting element, and a gate electrode connected to a first node;

a second transistor comprising a first electrode connected to a data line, a second electrode, and a gate electrode connected to a first scan line;

a third transistor comprising a first electrode, a second electrode connected to the second electrode of the first transistor, and a gate electrode connected to a second scan line;

a first capacitor connected between the first voltage line and a second node;

a second capacitor connected between the first node and the second node;

a test transistor comprising a first electrode connected to the first electrode of the first transistor, a second electrode electrically connected to the second node, and a gate electrode connected to a third scan line;

a eighth transistor connected between the second node and the second electrode of the second transistor and comprising a gate electrode connected to a fourth scan line; and a nineth transistor connected between the first node and the first electrode of the third transistor, and comprising a gate electrode connected to the fourth scan line, wherein, during a first frame, a data signal delivered through the data line is provided to a first end of the second capacitor through the second transistor and the eighth transistor, and wherein, during a second frame, a signal of a second end of the second capacitor is delivered to the data line through the nineth transistor, the third transistor, the first transistor, the test transistor, the eighth transistor and the second transistor.

3. The pixel of claim 2, wherein the pixel operates in a normal mode and a test mode, wherein the normal mode includes the first frame, and wherein the test mode includes the first frame and the second frame.

4. The pixel of claim 2, wherein at least one of the first to third transistors is a P-type transistor, and each of the test transistor, the eighth transistor and the nineth transistor is an N-type transistor.

5. A display device comprising:

a pixel connected to a first scan line, a second scan line, and a third scan line; and a driving circuit which drives the first scan line, the second scan line and the third scan line, wherein the pixel includes:

a light emitting element;

a first transistor comprising a first electrode electrically connected to a first voltage line, a second electrode electrically connected to the light emitting element, and a gate electrode connected to a first node;

a second transistor comprising a first electrode connected to a data line, a second electrode, and a gate electrode connected to the first scan line;

a third transistor comprising a first electrode, a second electrode connected to the second electrode of the first transistor, and a gate electrode connected to the second scan line;

a test transistor comprising a first electrode connected to the first electrode of the first transistor, a second electrode electrically connected to the second electrode of the second transistor, and a gate electrode connected to the third scan line, wherein the first scan line receives a first scan signal, and wherein each of the second scan line and the third scan line receives a second scan signal;

a first capacitor connected between the first voltage line and a second node;

a second capacitor connected between the first node and the second node;

a eighth transistor connected between the second node and the second electrode of the second transistor and comprising a gate electrode connected to a fourth scan line;

a nineth transistor connected between the first node and the first electrode of the third transistor and comprising a gate electrode connected to the fourth scan line; and a tenth transistor connected between the first electrode of the first transistor and a bias line, and comprising a gate electrode connected to a fifth scan line.

6. The display device of claim 5, wherein at least one of the first to third transistors is a P-type transistor, and each of the test transistor, the eighth transistor and the nineth transistor is an N-type transistor.

* * * * *